(12) United States Patent
Lin et al.

(10) Patent No.: US 8,186,863 B2
(45) Date of Patent: May 29, 2012

(54) LINEAR LIGHT SOURCE HAVING LIGHT GUIDE WITH TAPERED SAW TOOTH STRUCTURES

(75) Inventors: Ching-Yuan Lin, Taipei (TW); Yi-Min Chen, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 187 days.

(21) Appl. No.: 12/637,129

(22) Filed: Dec. 14, 2009

(65) Prior Publication Data

US 2011/0058366 A1  Mar. 10, 2011

(30) Foreign Application Priority Data

Sep. 10, 2009  (TW) .............................. 98130616 A

(51) Int. Cl.
*F21V 7/04* (2006.01)
(52) U.S. Cl. ........................ 362/555; 362/560
(58) Field of Classification Search .................. 362/555, 362/626, 560, 606–608
See application file for complete search history.

(56) References Cited

U.S. PATENT DOCUMENTS

| | | | |
|---|---|---|---|
| 2002/0196617 A1* | 12/2002 | Huang | 362/27 |
| 2004/0095620 A1 | 5/2004 | Lin | |
| 2004/0252522 A1* | 12/2004 | Wu | 362/555 |
| 2005/0088705 A1 | 4/2005 | Okamoto et al. | |
| 2005/0195452 A1 | 9/2005 | Tatsuno | |
| 2006/0120098 A1* | 6/2006 | Ikeda et al. | 362/551 |
| 2008/0304280 A1* | 12/2008 | Wu et al. | 362/555 |
| 2009/0015884 A1* | 1/2009 | Cho et al. | 358/475 |
| 2009/0015886 A1 | 1/2009 | Kim et al. | |

FOREIGN PATENT DOCUMENTS

| | | |
|---|---|---|
| JP | 11-232912 | 8/1999 |
| JP | 2003262735 | 9/2003 |
| TW | 579640 | 3/2004 |
| TW | 245864 | 1/2005 |

OTHER PUBLICATIONS

English Abstract of JP11-232912.
English Abstract of TW579640.
English Abstract of JP2003262735.
English Abstract of TW245864.

* cited by examiner

*Primary Examiner* — Julie Shallenberger
(74) *Attorney, Agent, or Firm* — WPAT, P.C.; Anthony King

(57) ABSTRACT

The present invention discloses a linear light source having light guide with tapered saw tooth structures for Charge Coupling Device Module (CCDM). The linear light source comprises a light guide and at least two Light Emitting Diodes (LED's). The light guide includes two incident surfaces, a reflective surface, two refractive surfaces and an ejective surface. The reflective surface has a tapered saw tooth structure; the LEDs are disposed at two ends of the light guide. Upon emission of light from the LEDs, light enters into the light guide, reflected by the tapered saw tooth structures, and then ejected from the ejective surface. It is possible to form a U-shaped lambert distribution in the sub scanning direction, thereby generating the complementary effect for the pickup lens and the CCD image sensor of CCDM, as well as to create a linearly converged lambert distribution in the main scanning direction.

3 Claims, 22 Drawing Sheets

B-B'

LINEAR LIGHT SOURCE HAVING LIGHT GUIDE WITH TAPERED SAW TOOTH STRUCTURES

BACKGROUND OF THE INVENTION

1. Field of the Invention

The present invention relates to a linear light source having a light guide with the tapered saw tooth structures; in particular, the present invention relates to a linear light source which generates an illumination distribution and produces the complementary effect with the pickup lens and the CCD image sensor so as to be applied to high-resolution fax machines, printers and scanners.

2. Description of Related Art

At present, image read devices such as scanners, fax machines, multi-functional office apparatus and photocopy machines have been widely applied to document storage and transfer operations, and one of the cores in such devices is the optical engine module 100, as shown in FIG. 1, comprising a light source 1, a set of reflection mirrors 140, a pickup lens 120 and an image sensor 130. When light is emitted from the light source 1 onto the object (e.g., document 55 in FIG. 1), it is reflected by the object (document 55) and, through multiple reflections in the set of reflection mirrors 140, focused by the pickup lens 120 and then imaged on the image sensor 130. The created image is next converted into electronic signals by the image sensor 130. Herein the Charge Coupling Device (CCD) is commonly used as the image sensor 130, so the optical engine module is usually referred as the CCD Module (CCDM) 100.

The light source 1 is conventionally a Cold Cathode Fluorescent Lamp (CCFL). However, because of requirement on additional voltage transformers and inconsistency against environment protection regulations due to inclusion of halogen, it has be gradually replaced by Light Emitting Diodes (LEDs); for example, US Patent US2004/0095620 disclosed a light source using the LED for scanners. The LED provides advantages of power saving and long lifespan; whereas the lambert distribution (said illumination distribution in general) of the light source using the LED for scanners is less uniform than the CCFL, causing reduced scanning resolution or uneven reflection light from the document. As a result, it can be only applied in low-speed scanners.

Typically the light emitted from the light source of the CCDM should be approximately the same length as the width of the document; for example, Japan Patent JP11-232912 proposes using LEDs as the light source and an LED array is arranged at rear side of various rod lenses, thereby creating a uniform illumination distribution for application on scanners.

To achieve the desirable uniformity in the light emitted from light sources, Taiwan Patent TW579640 and US Patent US2005/0088705 disclosed different light converging devices for scanners, which essentially use the light converging components and light guiding components in order to guide the light emitted from light sources to the document to be scanned. Furthermore, the disclosure of Japan Patent JP2003262735 utilized a saw-toothed reflective surface to apply to the light guide plate in the backlight module; Taiwan Patent TW I245864 disclosed a light source having a reflective surface of saw tooth shape which includes a light guide bar including a saw-tooth-shaped reflective surface and an arc-shaped ejective surface, thereby allowing to achieve the uniformity in light emitted from the LED array by means of the light guide. US2009/0015884 and US2009/0015886 proposed installations of light source at the lateral surface of the light guide and multiple reflective recesses on the reflective surface of the light guide so as to form a uniform lambert distribution.

However, due to the effect of the optical surfaces of the pickup lens, the reflected light from document is incident into the pickup lens and focused by the pickup lens, light intensity ejected around the peripheral of the pickup lens becomes weaker relative to the center of the pickup lens. The light intensity received around the peripheral of CCD is caused as lower than the center of CCD. The uniform illumination in the sub scanning direction of the light source may thus result in less brightness at the edge of document images, and resolution of the scanner is undesirably reduced. As shown in FIG. 2, a diagram of illumination distribution and structure of a CCFL (or xenon lamp) used in a high-speed high-resolution CCDM is shown. It illustrates that the lamp electrode 72 drives the xenon lamp tube 71 to illuminate, and through specific length and illumination arrangement, the illumination distribution in the sub scanning direction forms a U-shaped illumination distribution 73. Which the U-shaped illumination distribution 73 is characterized in lower illumination at the light source center 74 but higher on both ends, thus may compensate the weaker light intensity on the peripheral of CCD such that the CCDM is allowed to generate image signals of uniform intensity. Alternatively, as shown in FIG. 3, US Patent US2005/019452 proposed the arrangement of an LED array 91 on the rear side of the rod lens 92 which controls the brightness of each LED by means of the LED array 91 thereon, such that the illumination of emitted light projected on the document to be scanned is allowed to form an even or a U-shaped illumination distribution, thereby improving the uniformity in the sub scanning direction for replacing the CCFL applied in high-speed scanners. But such a technical approach applying installation of LED array and the like on the rear side of light guide may require multiple LED elements and complicated control operations. Another technical solution is to place the light source on the front side of the light guide, as shown in FIG. 4, in which an end cap 81 is installed on the light source ejective end in order to prevent escape of significant amount of light from the adjacent side, and the reflective tooth 821 is installed on the polygonal light guide 82, such that light emitted from the light source can be sufficiently reflected in order to enhance the usability of light and the shape of light is also allowed to be modified by means of different tooth shapes and tooth pitches. Whereas, different tooth shape and tooth pitch may cause difficulties in manufacture processes, leading to undesirable high fabrication costs.

Consequently, in order to simplify manufacture processes and to reduce fabrication costs, efforts in installation of LED light source on the light guide surface so as to exhaust the LED usage for achieving more concise efficiency and to be forming a U-shaped illumination distribution complementary to the document image in the sub scanning direction on the ejective surface as well as forming a linearly converged illumination distribution in the main scanning direction, allowing to successfully accomplish the objectives of applications in high-resolution and high-speed scanning operations.

SUMMARY OF THE INVENTION

It is a primary object of the present invention to provide a linear light source having a light guide with tapered saw tooth structures, applicable to a Charge Coupling Device Module (CCDM) which the CCDM includes a pickup lens and a Charge Coupling Device (CCD) image sensor. The linear light source of present invention comprises a light guide, a reflective cartridge and two Light Emitting Diodes (LEDs). The light guide is made of optical material, and the light guide has two incident surfaces, a reflective surface, two refractive surfaces and an ejective surface; the ejective surface is facing to document to be scanned and the reflective surface is disposed correspondingly to the ejective surface. The two LEDs are disposed on the two incident surfaces at two ends of the light guide individually. The two refractive surfaces of the light guide are disposed on two sides of the reflective surface. The two refractive surfaces and the reflective surface are covered by the reflective cartridge. The reflective surface of the light guide has the tapered saw tooth structure, each of the tapered saw tooth structure has a chamfer surface on each side of the tapered saw tooth structure along the main scanning direction. The ejective surface is a convex optical surface facing toward the object side (document side). Thus, the two LEDs emit light entering into the light guide from the incident surfaces. The light is reflecting by the reflective surface, refracting by the refractive surface and ejecting from the ejective surface to project onto the object. Such that the ejective light is forming a linearly converged illumination distribution in the main scanning direction and a U-shaped illumination distribution in the sub scanning direction so as to generate the complementary effect which compensates the weaker light intensity on the CCD peripheral, and thus creating the image signal of uniform light intensity.

It is another object of the present invention to provide a linear light source having a light guide with the tapered saw tooth structures. Two concave optical surfaces facing toward the LEDs are disposed on two incident surface of the light guide respectively. Each center of the two concave optical surfaces is located on the light incidence axis, so as to enhance light guide efficiency, to reduce light diffusion and to improve the average illumination of the light guide ejected from the ejective surface. Wherein, the light incidence axis is formed by connecting the central of two LEDs.

It is further object of the present invention to provide a linear light source having a light guide with tapered saw tooth structures. The ejective surface of the light guide is a concave optical surface along the sub scanning direction where the concave optical surface is facing toward the object side; so as to increase the illumination flux at both ends of the ejective surface in the light guide.

As such, the linear light source having a light guide with the tapered saw tooth structures according to the present invention offers one or more of following features:

(1) by means of the light guide with tapered saw tooth structures and arrangement of LED light sources on the incident surfaces at two sides of the light guide according to the present invention, it is possible to improve the prior art drawbacks of high fabrication cost due to direct illumination with a plurality of LED light sources and complicated control operations;

(2) through the tapered saw tooth structures in the light guide according to the present invention, it is possible to form a linearly converged illumination distribution in the main scanning direction and a U-shaped illumination distribution in the sub scanning direction, so as to complementarily compensate the phenomenon of weaker light intension on the peripheral of CCD, thus facilitating formation of image signals have uniform light intensity;

(3) by disposing the structure of concave optical surface on the ejective surface or disposing the structure of concave optical surfaces on the incident surfaces in the light guide according to the present invention, it is possible to increase the usage of light and accordingly enhance the light intensity.

DETAILED DESCRIPTION OF THE PREFERRED EMBODIMENTS

To facilitate better appreciations of the present invention, references are hereunder made to the following preferred embodiments in conjunction with appended drawings for further illustrating in details the structure of the present invention and technical features thereof.

Figure 5:
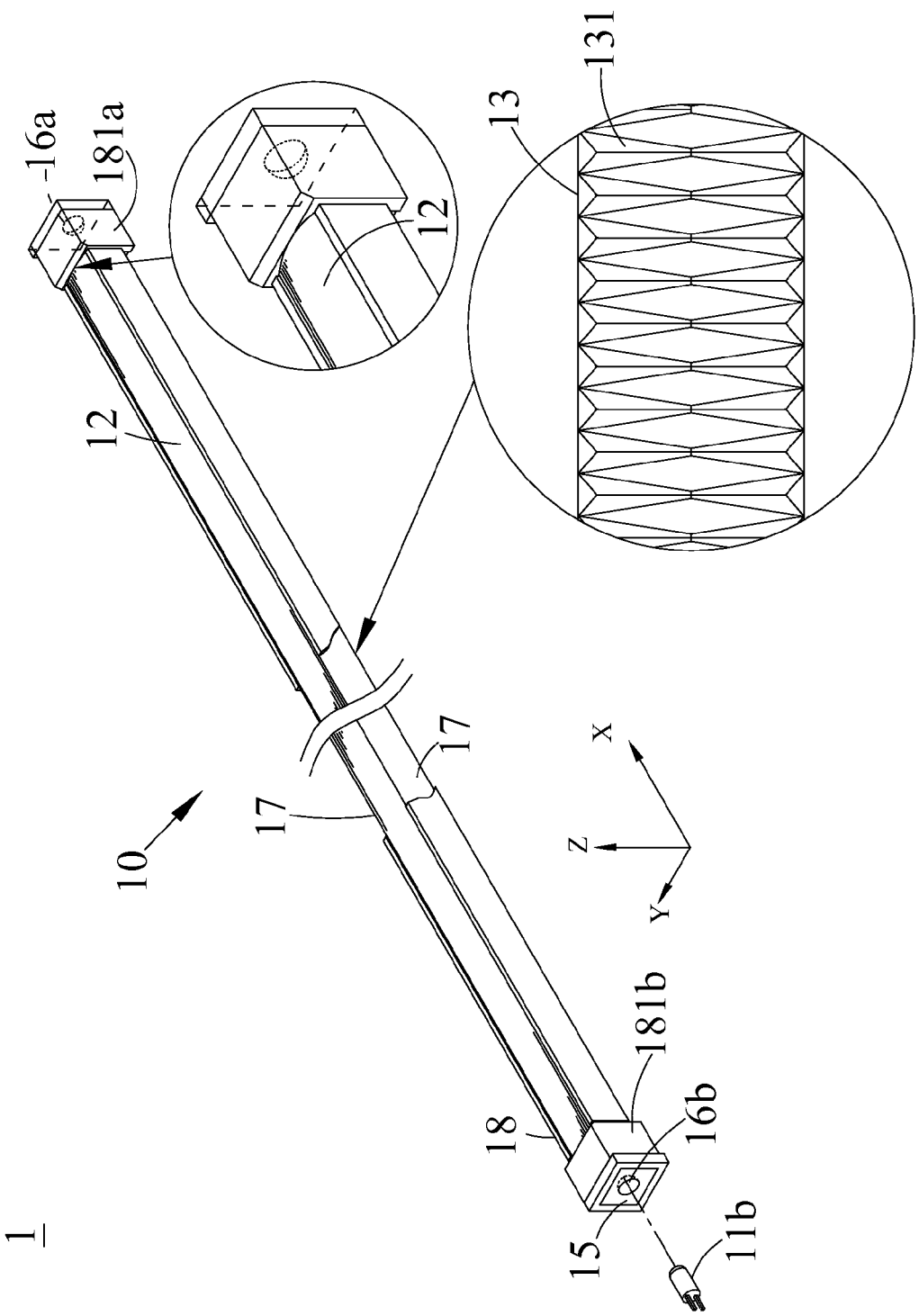
FIG. 5 shows a diagram of the linear light source having a light guide with the tapered saw tooth structures for a first embodiment according to the present invention.
Figure 6:
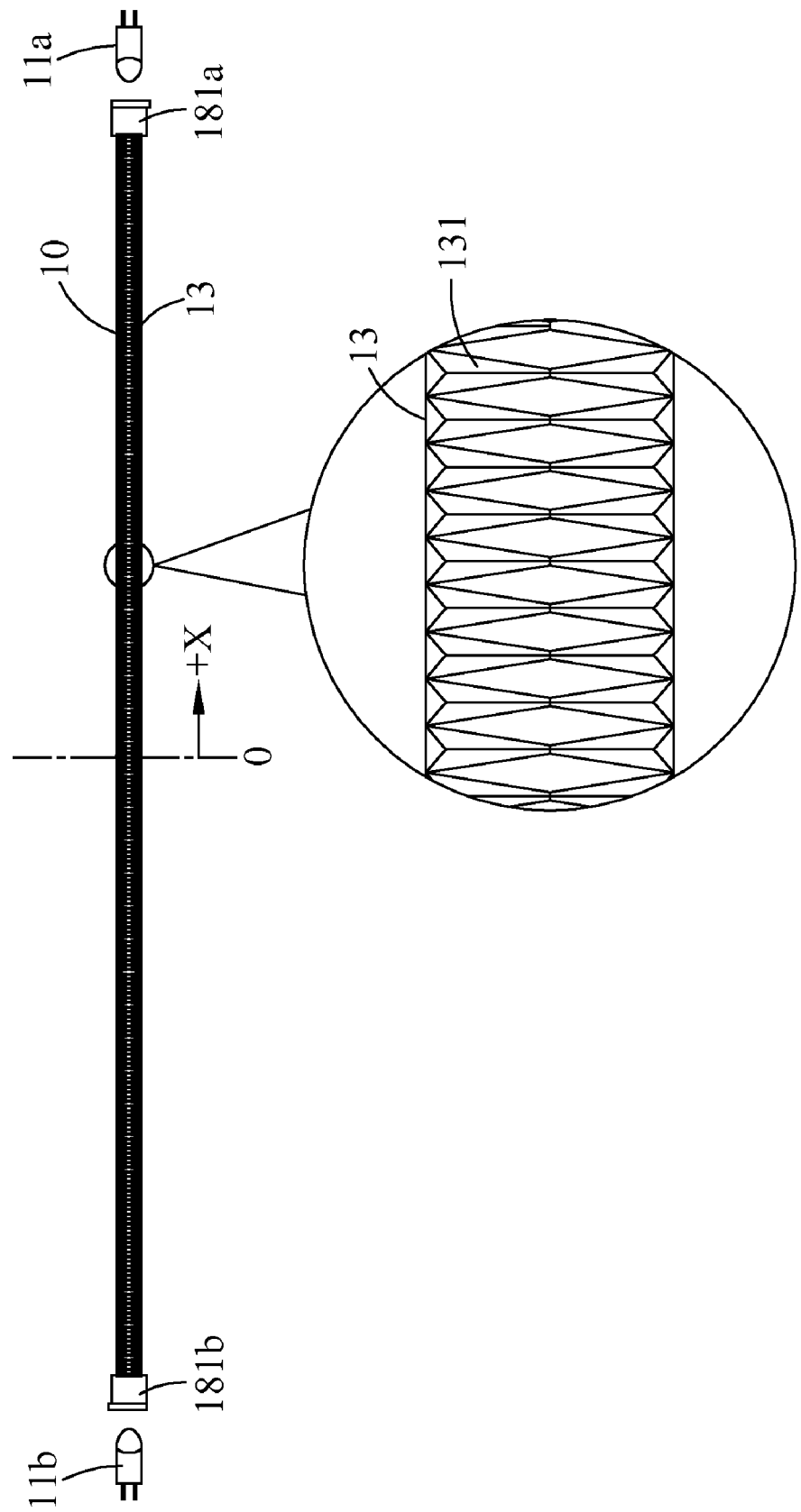
FIG. 6 shows a diagram of the reflective surface in the light source having a light guide with the tapered saw tooth structures according to the present invention.
Figure 7:
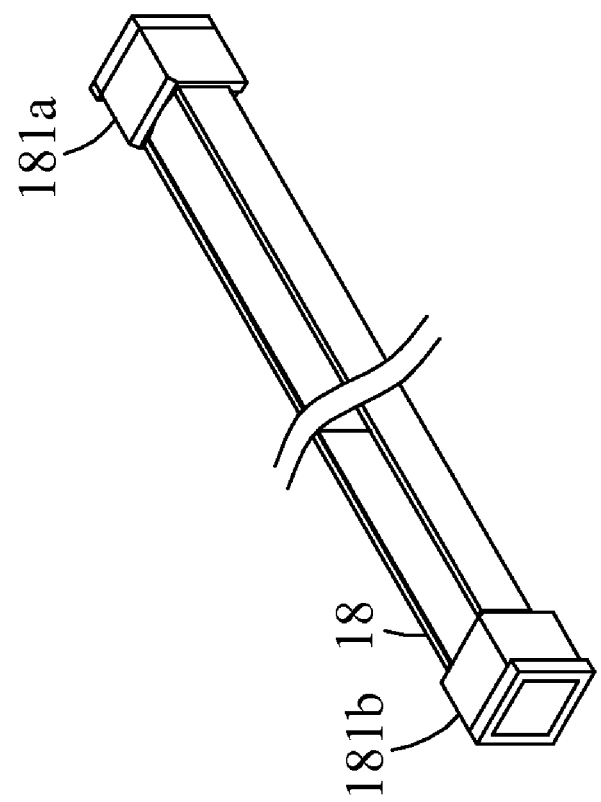
FIG. 7 shows a diagram of a reflective cartridge according to the present invention.
Figure 8:
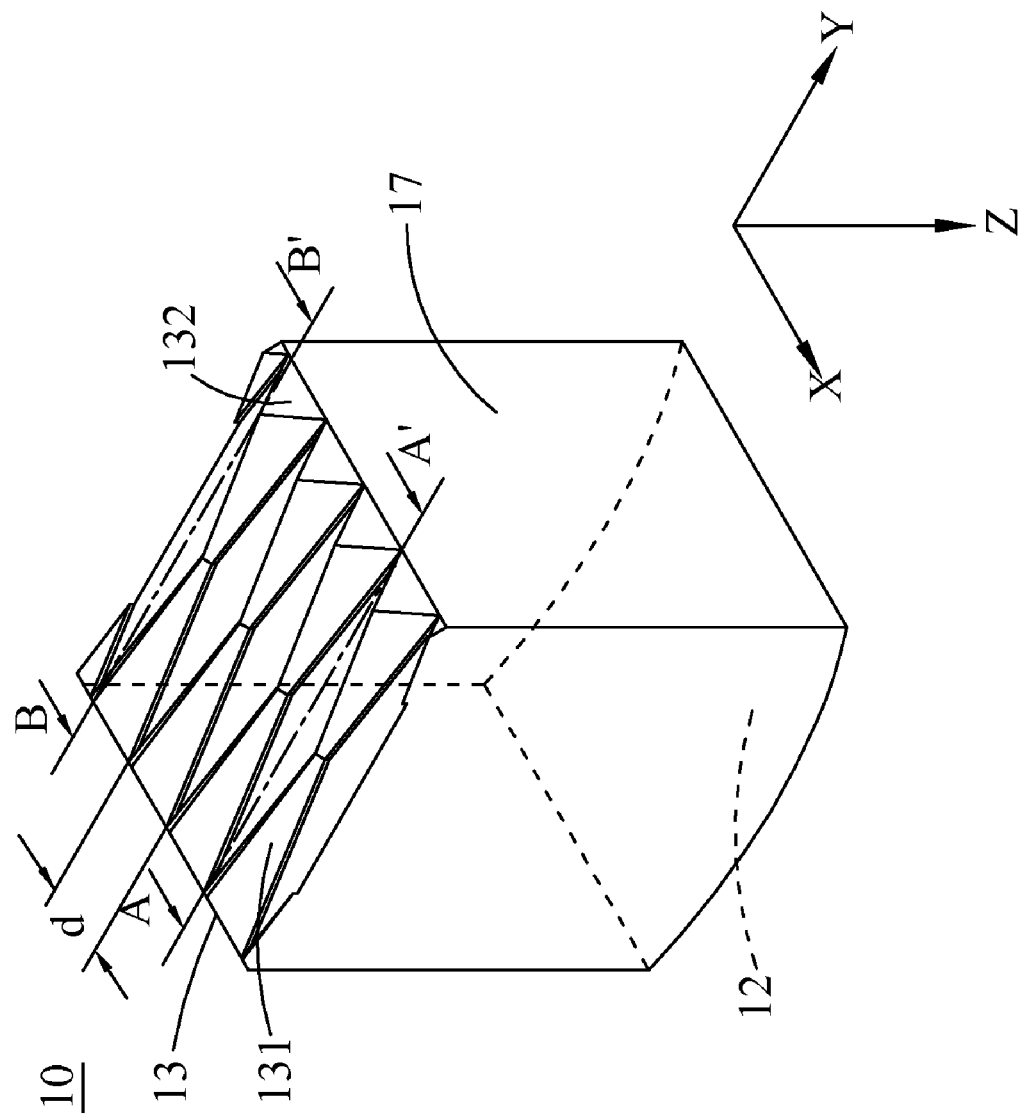
FIG. 8 shows a (sectional) detailed diagram of the perspective view in a light guide for embodiments according to the present invention.
Figure 9:
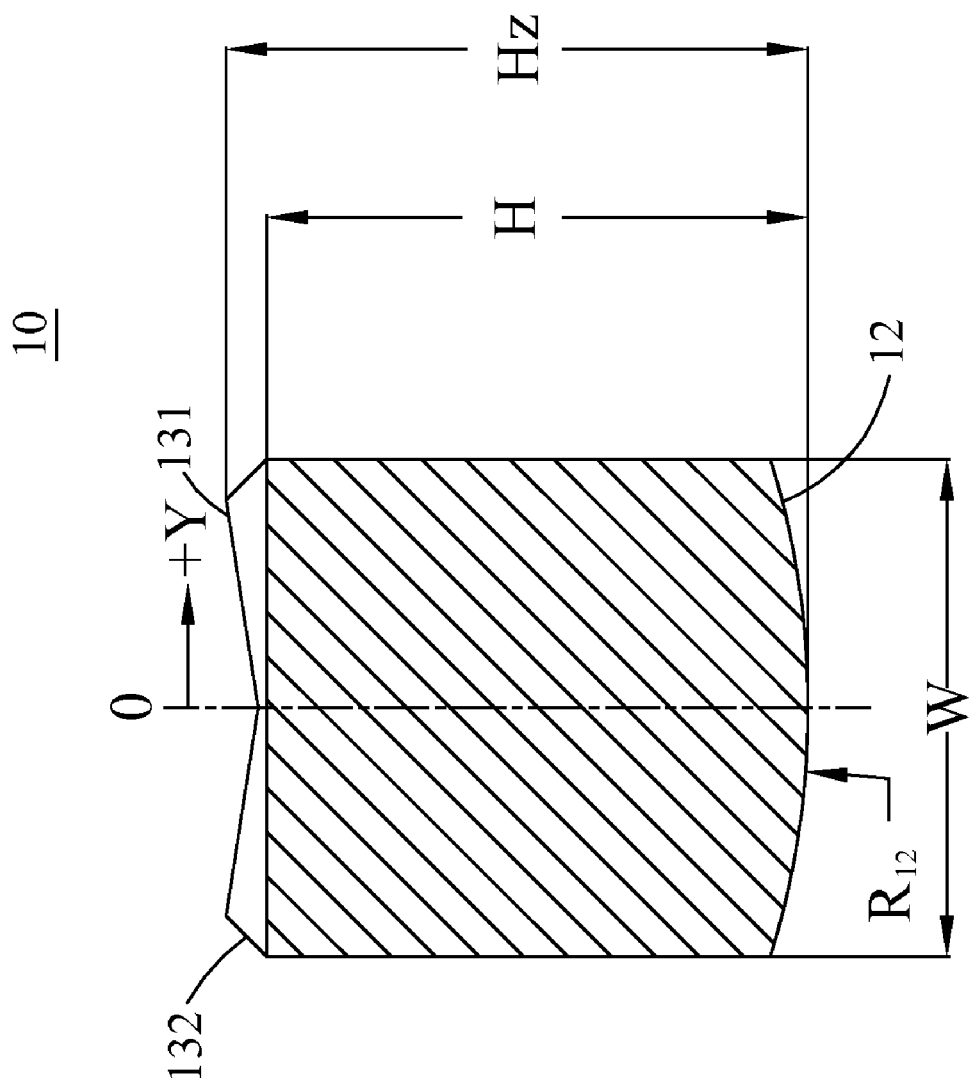
FIG. 9 shows a diagram of A-A' cross-section of FIG. 8.
Figure 10:
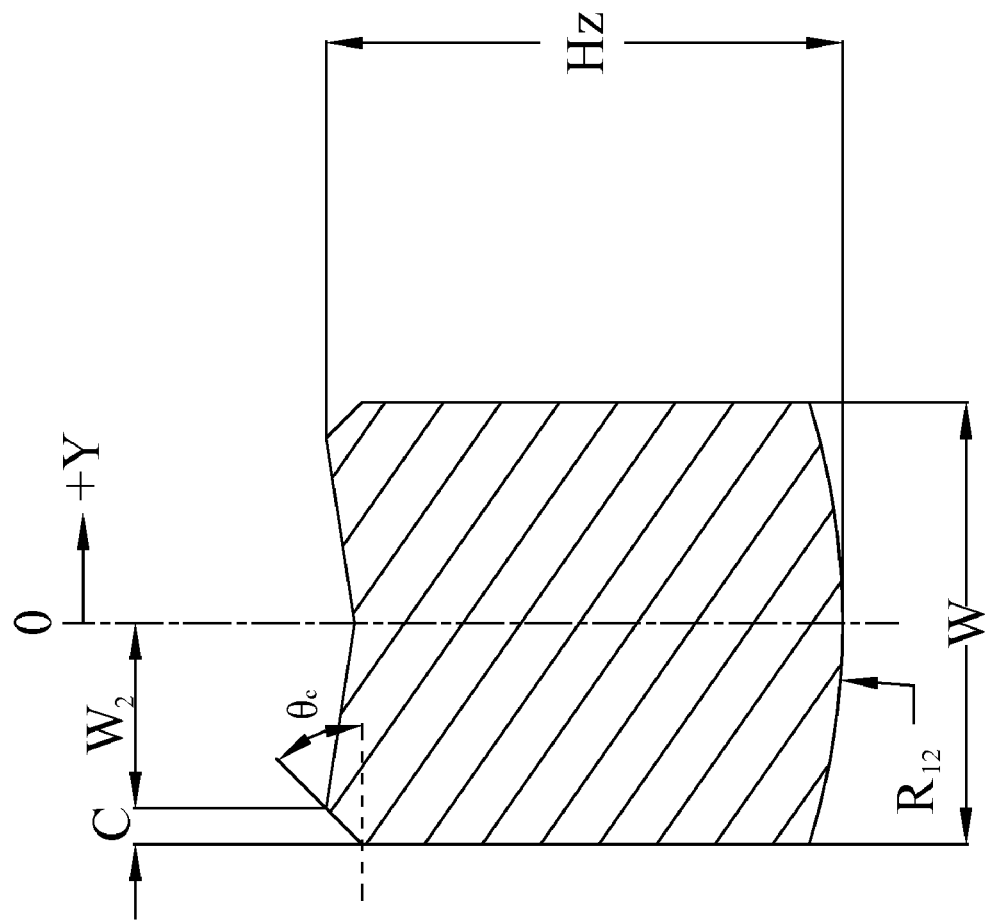
FIG. 10 shows a diagram of B-B' cross-section of FIG. 8.

Refer first to FIG. 5, wherein a diagram of the linear light source having a light guide with the tapered saw tooth structures for a first embodiment according to the present invention is shown. FIG. 6 shows a diagram of the reflective surface in the light source having a light guide with the tapered saw tooth structures according to the present invention, and FIG. 7 shows a diagram of a reflective cartridge according to the present invention. The linear light source 1 comprises a light guide 10, a reflective cartridge 18 and two Light Emitting Diodes (LEDs) (11a, 11b), wherein the light guide 10 is made of optical materials. The light guide 10 comprises two incident surfaces 15, a reflective surface 13, two refractive surfaces 17 and an ejective surface 12, which reflective surface 13 and ejective surface 12 is correspondingly disposed and the LEDs (11a, 11b) are placed on the incident surfaces 15 located at both ends of the light guide 10; the two refractive surfaces 17 are respectively disposed on two sides of the reflective surface 13 for the purpose of light refraction; the ejective surface 12 is convex in the main scanning direction (Y direction), whose convex optical surface facing toward the object side, with a curvature radius of $R_{12Y}$. Furthermore, the ejective surface 12 can be concave in the sub scanning direction (X direction), whose concave optical surface facing toward the object side, with a curvature radius of $R_{12X}$. The reflective surface of the light guide 10 has the tapered saw tooth structures 131, each of the tapered saw tooth structures 131 has a chamfer surface 132 on each side of the tapered saw tooth structure 131 along the main scanning direction, in which the reflective surface 13 is used to reflect light entering into the incident surface 13 of the light guide 10 to the ejective surface 12, as shown in FIGS. 8 to 10; herein $\theta_c$ indicates the chamfer surface angle which is pointed between the chamfer surface 132 and the reflective surface 13 projected on the main scanning direction, c represents the projection length of the chamfer surface 132 in the main scanning direction, W represents the width of the light guide 10 in the main scanning direction, d represents the distance between two tapered saw tooth structures, H represents the length from the reflective surface 13 to the apex of the ejective surface 12 which is the height of the light guide, and Hz represents the length from the bottom of the tapered saw tooth to the apex of the ejective surface 12. The following equations describe the relationship between them:

$$H_z = H + c \sin \theta_c \quad (1)$$

$$\theta_c = \cos^{-1}\left(\frac{(W - 2W_2)}{2c}\right) \quad (2)$$

Furthermore, the incident concave surface 16a, 16b is disposed on the incident surface 15, wherein the incident concave optical surface 16a, 16b is facing toward the LEDs (11a, 11b) side and the centers of the incident concave optical surface 16a, 16b on the incident surfaces 15 is located on the light incidence axis connected by the central of the two LEDs (11a, 11b), with a curvature radius of $R_{16a}$ and $R_{16b}$, respectively. The diameter of the incident concave optical surfaces 16a, 16b on the incident surfaces 15 is Dc which is placed thereon in accordance with the LEDs 11a, 11b.

Additionally, in the sub scanning direction (X direction), there on a concave optical surface of a curvature radius $R_{12X}$ is disposed on the ejective surface 12, which allows to further converge the illumination distribute for the light emitted from the ejective surface 12 in the sub scanning direction.

The reflective cartridge 18 is a U-tube allowing to accommodate the light guide 10, wherein the U-tube is made of metal or has a reflective layer so as to reflect light penetrated through the light guide 10 returning to the light guide 10; the reflective cartridge 18 further includes two end caps (181a, 181b) for masking light in the inactive area.

Figure 11:
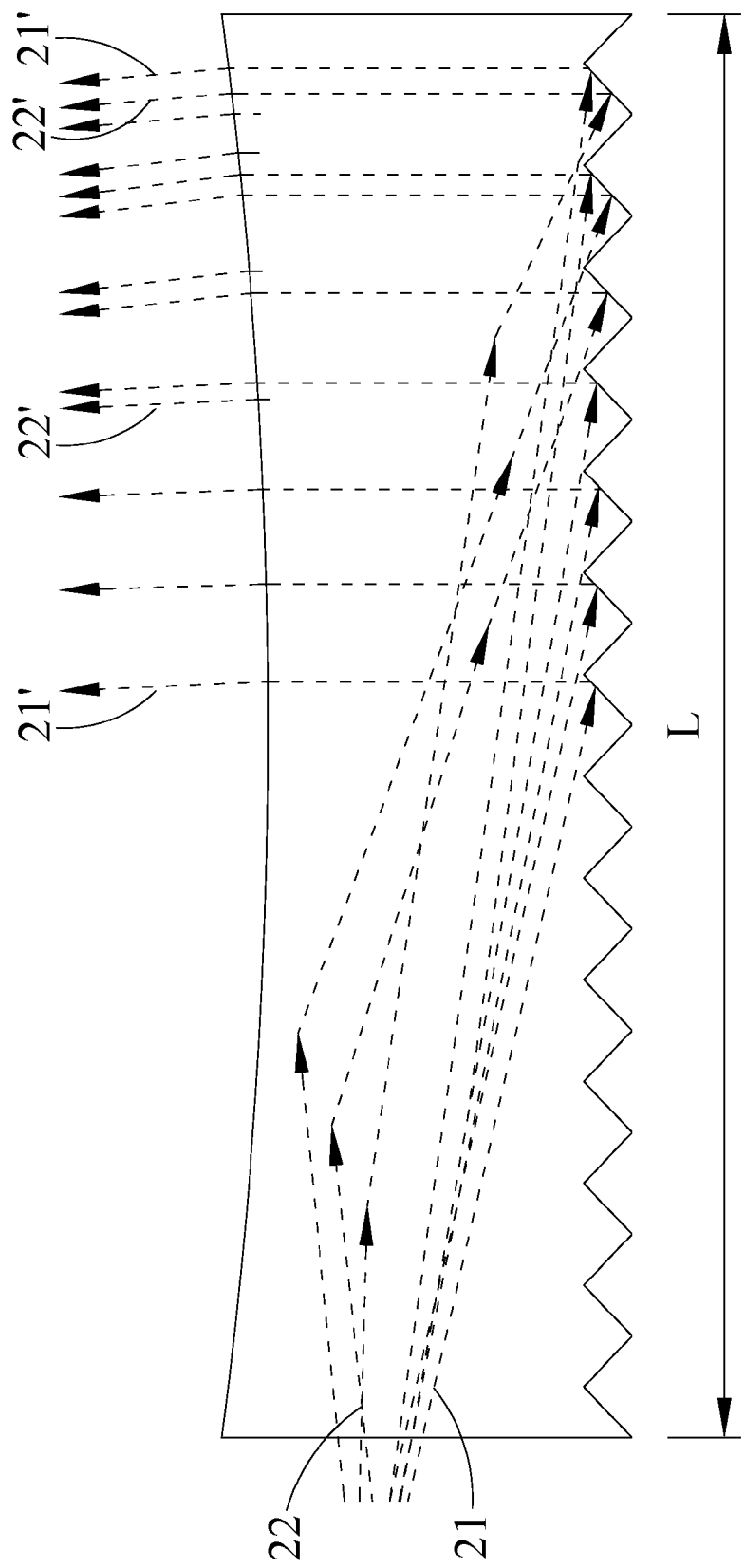
FIG. 11 shows a diagram of the U-shaped illumination distribution formed by reflection of incident light in the sub scanning direction for the embodiments according to the present invention.

The light guide 10 with the tapered saw tooth structures according to the present invention is made of optical material, in which the refractive index of the optical material $n_d$ is greater than the refractive index of air 1.0, so upon emission of light from the LEDs, light enters into the light guide 10 by way of the incident surfaces 15 on two ends of the light guide, and since the refractive index of the optical material $n_d$ is greater than that of air 1.0. The light entering into the light guide 10, if refracts within the critical angle then the light refracts in the light guide 10 without penetrating out, or, if refracts larger than the critical angle then the light penetrated out the light guide 10 can be refracted by the reflective cartridge 18 back into the light guide 10. As shown in FIG. 11, since each light ray emitted from the LED is varying in direction thus the light within the light guide 10 reached to the reflective surface 13 can be reflected by the tapered saw tooth structures 131 of the reflective surface 13. In the sub scanning direction, suppose light 21 emitted from the LED enters into the light guide 10 and is reflected to the reflective surface 13, then light 21 will be reflected to the ejective surface 12 by the tapered saw tooth structures 131 thus forming light 21'; in case light 22 reaches the refractive surface 17 at an angle less than the refraction critical angle, refracted by the refractive surface 17 and illuminated onto the reflective surface 13, then light 22 will be reflected by the tapered saw tooth structures 131 to the ejective surface 12 thereby forming light 22'. By means of the light guide 10 according to the present invention, in the sub scanning direction, illumination of light projected from the ejective surface 12 is higher at two ends of the light guide 10, e.g., closed to the both end of incident surfaces 15. While illumination of light projected from the ejective surface 12 is lower at the central part. However, by means of the tapered saw tooth structures 131 of the reflective surface 13, the illumination at the central part is prevented to be over lower, thereby creates a smoother U-shaped illumination distribution which is higher on two ends and lower at central area.

To achieve the optimal effect, the distance d between these two reflective tooth surfaces 13, the length H from the reflective surface 13 to the apex of the ejective surface 12 (i.e., the height of the light guide) and the length Hz from the bottom of the tapered saw tooth structures 131 to the apex of the ejective surface 12 may correspondingly fit into the length L of the light guide 10 in the sub scanning direction, the diameter of the LED and the like in accordance with the refraction index $n_d$ of the optical material in the light guide 10.

Figure 1:
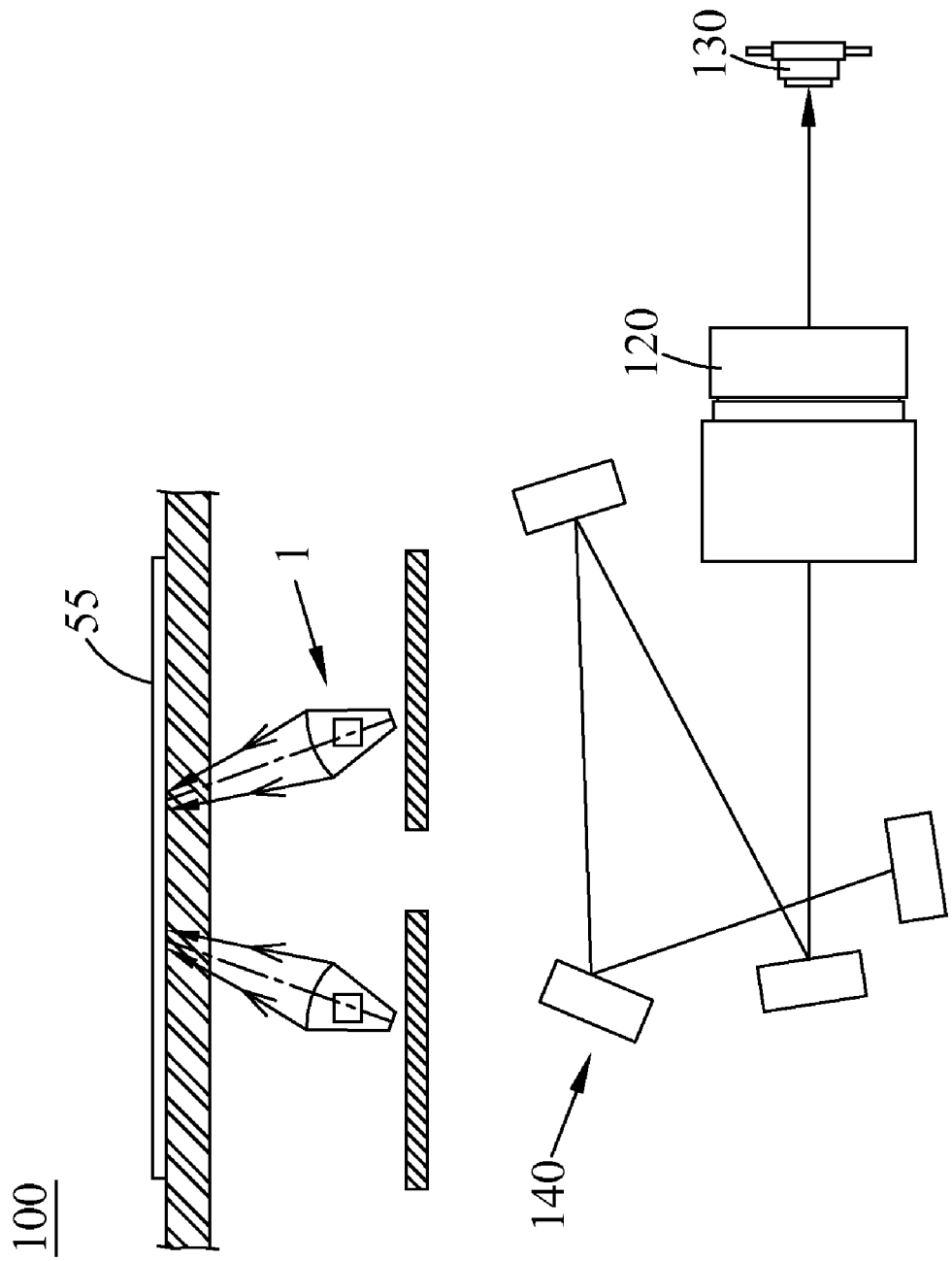
FIG. 1 is a diagram of a prior art light source applied to an image scanning module.
Figure 2:
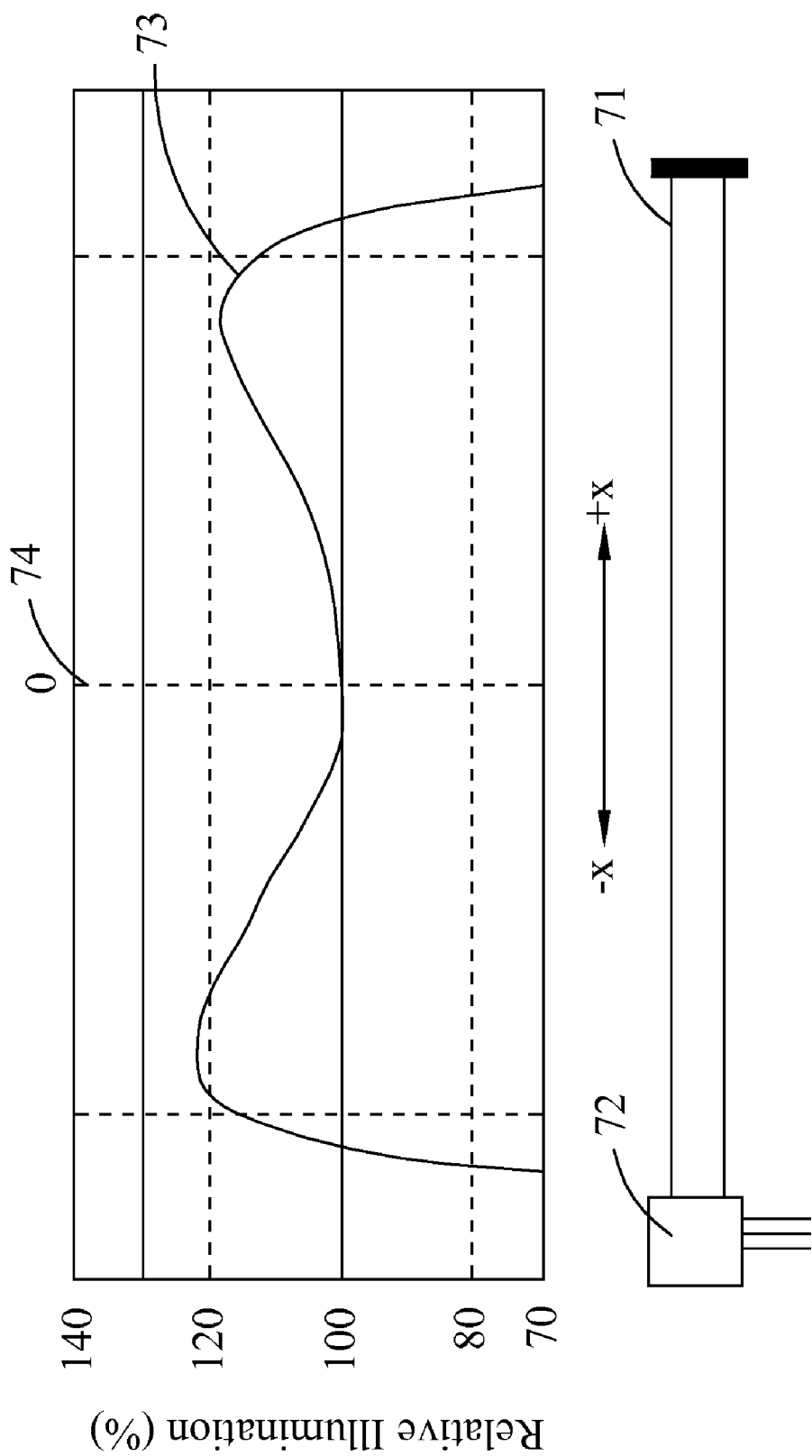
FIG. 2 is a diagram of an illumination distribution of the first prior art light guide.
Figure 3:
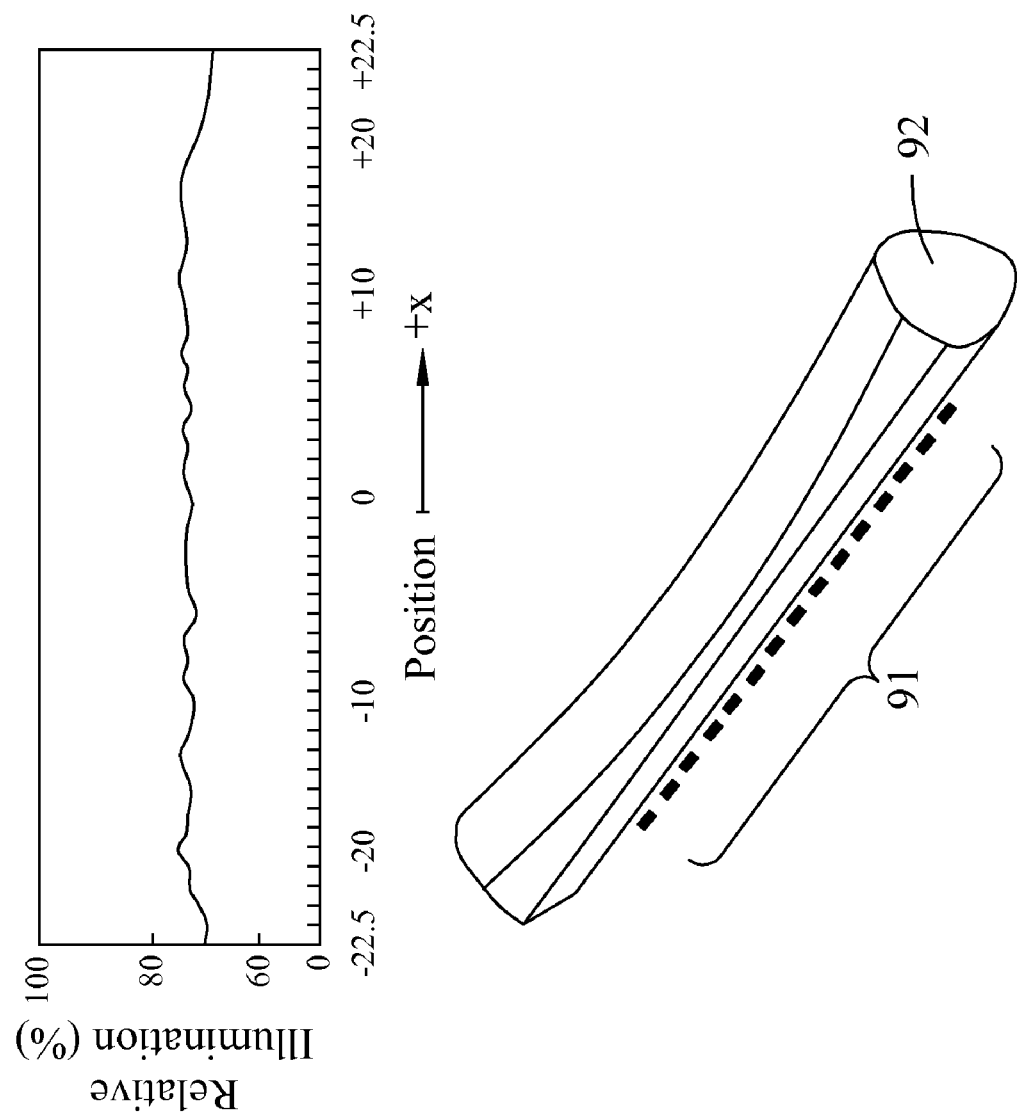
FIG. 3 is a diagram of the second prior art light guide and illumination distribution thereof.
Figure 4:
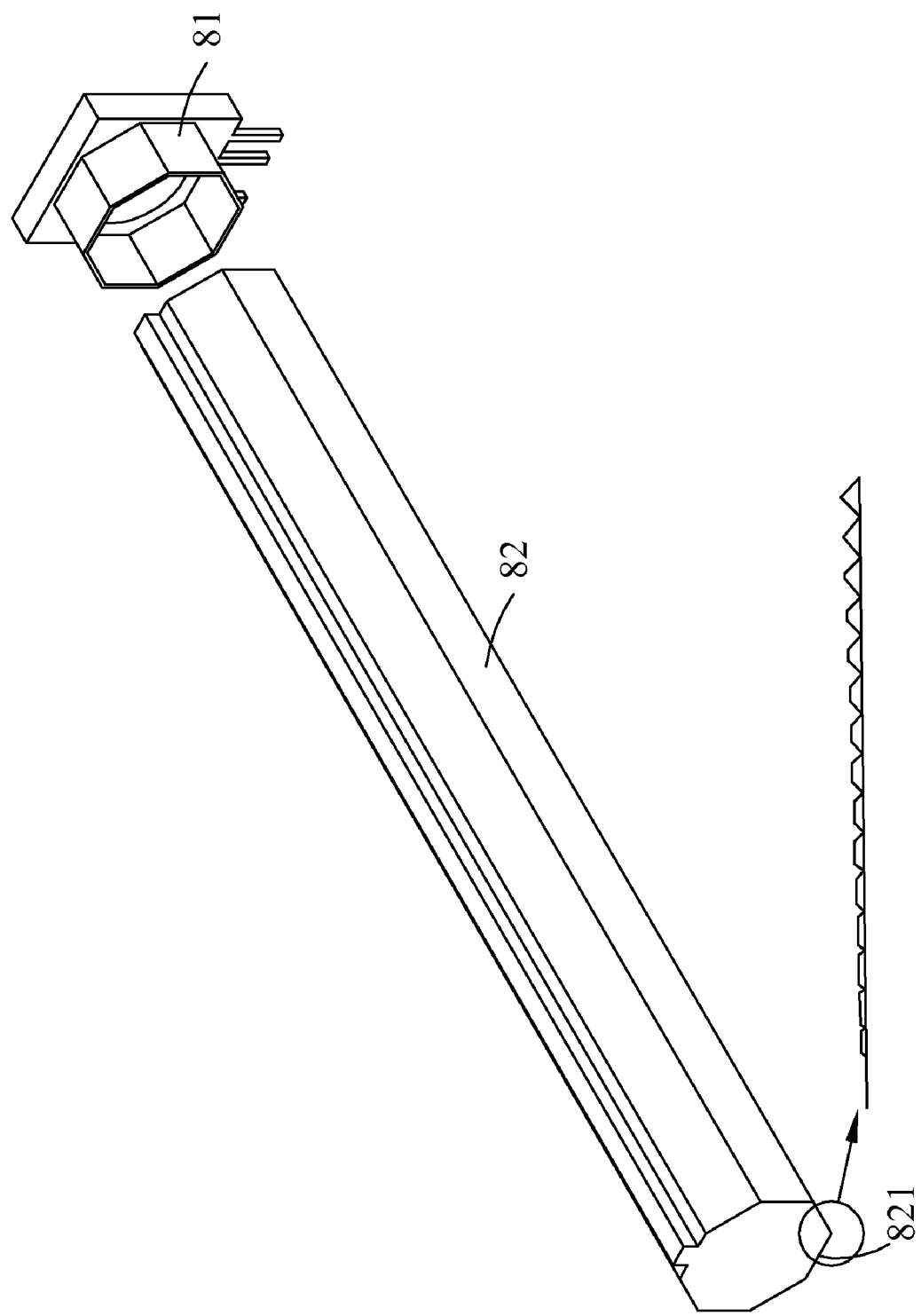
FIG. 4 is a diagram of the third prior art light guide.

The CCD image sensor used in the CCDM is a type of area sensor which generates a lower light intensity around the peripheral parts due to the light is focused on curved optical surfaces in the pickup lens, thus causes the electronic signal produced by the area sensor at such peripheral parts to be weaker, whereas the electronic signal produced at central region may be uniform and stronger than the peripheral parts. If the light projected onto the object (e.g., a document to be scanned) presents a uniform illumination distribution in the sub scanning direction (as shown in FIG. 1), then after the reflection by the document to be scanned, light will be focused by the pickup lens and received by the CCD image sensor. Then the image signal generated by the CCD image sensor will be weaker at peripheral parts (said darker than the center part). Therefore the degree of realism thereof will be reduced as well. However, improvement with the U-shaped illumination distribution generated by using the present invention as illustrated in further embodiments, the image signal generated by the CCD image sensor can be enhanced at peripheral parts, and the degree of realism thereof can be improved, thereby creating better resolutions and image electronic signals.

Figure 12:
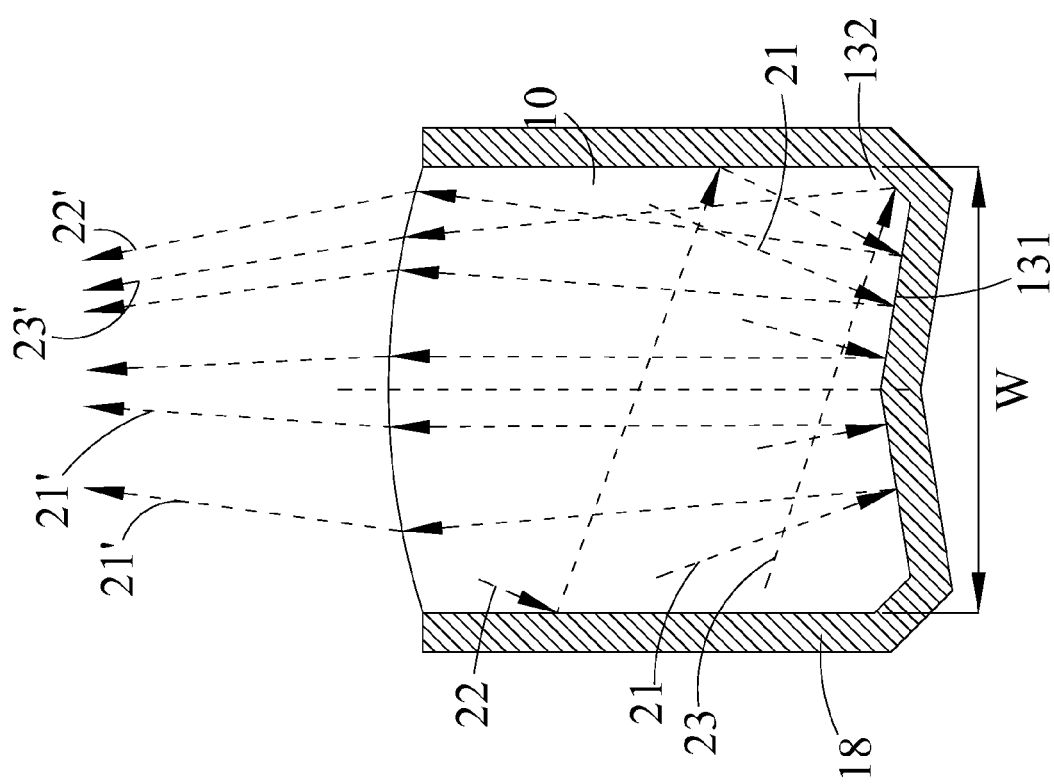
FIG. 12 shows a diagram of the linearly converged illumination distribution formed by reflection of incident light in the main scanning direction for the embodiments according to the present invention.

Moreover, as shown in FIG. 12, in the main scanning direction, light 21 is emitted from the LED, reflected to the ejective surface 12 by the tapered saw tooth structures 131 and then converged by the convex optical surface $R_{12}$ of the ejective surface 12, thereby forming light 21'; if light 22 reaches the refractive surface 17 in the light guide 10 at an angle less than the refraction critical angle, then it will be refracted and projected to the ejective surface 12 by the refractive surface 17 and then converged by the convex optical surface $R_{12}$ of the ejective surface 12, thereby forming light 22'; if light 23 reaches the refractive surface 17 in the light guide 10 at an angle greater than the refraction critical angle, then light 23 will penetrate through the light guide 10, reflected by the reflective cartridge 18 back into the light guide 10, and suppose light 23 reaches the chamfer surface 132 of the reflective surface 13, it will be reflected to the ejective surface 12 by the chamfer surface 132, then converged by the convex optical surface $R_{12}$ of the ejective surface 12, thereby forming light 23'. In other words, by means of the tapered saw tooth structures 131 and of the chamfer 132 in the reflective surface 13, the incident light 21, 22, 23 can be reflected to the ejective surface 12, then converged by the convex optical surface $R_{12}$ of the ejective surface 12 so as to form an illumination distribution of linear convergence. In the main scanning direction, light emitted by the light guide 10 can form a light beam of high lambert and small width in illumination distribution which is allowable for applications in image scanners. To achieve the optimal effect, the chamfer surface angle $\theta_c$ of the chamfer surface 132 and the length $W_2$ of the tapered saw tooth structures 131 may correspondingly fit into the width W of the light guide 10, the refraction index $n_d$ of the optical material, the curvature radius $R_{12Y}$ of the convex optical surface in the ejective surface 12 and the distance from the ejective surface 12 to the document to be scanned and the like.

To facilitate further descriptions and comparisons, the linear light source 1 having a light guide 10 with the tapered saw tooth structures 131 illustrated in the following embodiments are applied in an image scanner including a CCD image sensor of A3/A4 size, the width of the A3/A4 document to be scanned is ±105 mm (210 mm in width). The linear light source 1 comprises a light guide 10, a reflective cartridge 18 and two LEDs (11a, 11b), in which the LEDs (11a, 11b) are the high-illumination LEDs and can emit white light when the image scanner is started. The reflective cartridge 18 used herein is made of a U-tube opaque plastic, coated with aluminum reflection layer on the interior surface which allows to reflect light leaving the light guide 10 back into the light guide 10; the reflective cartridge 18 includes two end caps (181a, 181b) on two ends of the light guide 10 in order to mask light in the inactive area. The following embodiments adopt the light guide 10 of the same length (L=260 mm, ±130 mm), same height (H=6.5 mm) and same width (W=6.2 mm), at the same time the distance from the ejective surface 12 to the document to be scanned is set to 7 mm and the diameter of the LED (11a, 11b) is 2.1 mm After emission of light from the LEDs 11a, 11b and through masking by the two end caps (181a, 181b) of width 10 mm, the light of length ±120 mm presenting a U-shaped illumination distribution in the sub scanning direction (X direction) and a linearly converged illumination distribution in the main scanning direction (Y direction), can be emitted from linear light source 1 projecting onto the object (e.g., the document to be scanned). The aforementioned sizes and dimensions are simply illustrative, rather than being limited thereto.

Refer now to FIGS. 15 to 22, wherein the illumination distribution diagrams of root mean square illumination and position in the sub scanning direction and main scanning direction over the target object (at a distance of 7 mm) for each embodiment are depicted. In the Figures, a length of ±140 mm in the sub scanning direction (with an effective range ±105 mm relative to the object), and a width of ±10 mm in the main scanning direction (with an effective range ±2.5 mm relative to the object without considering light aperture), are shown.

First Embodiment

Refer now to FIG. 5, wherein a diagram of the linear light source having a light guide with the tapered saw tooth structures for the present embodiment is shown. In the present embodiment, the light guide 10 is made of an optical material, Polycarbonates (PC), refractive index $n_d$=1.58, and the incident surfaces 15 is a plane and the ejective surface 12 is a plane in the sub scanning direction. Relevant parameters for such a light guide 10 are illustrated in the following Table 1.

TABLE 1

Relevant Parameters for Light Guide according to First Embodiment

| | |
|---|---|
| Refractive Index $n_d$ | 1.58 |
| Curvature Radius of Ejective Surface in Main Scanning Direction $R_{12Y}$ (mm) | −10.13 |
| Curvature Radius of Ejective Surface in Sub scanning Direction $R_{12X}$ (mm) | ∞ |
| Chamfer Surface Angle $\theta_c$ (deg.) | 37.5 |
| Projection Length of Chamfer Surface in Main Scanning Direction c (mm) | 0.55 |
| Distance between Two Tapered Saw Teeth d (mm) | 0.55 |
| Length from Bottom of Tapered Saw Teeth to Apex of Ejective Surface Hz (mm) | 6.84 |

Second Embodiment

Figure 13:
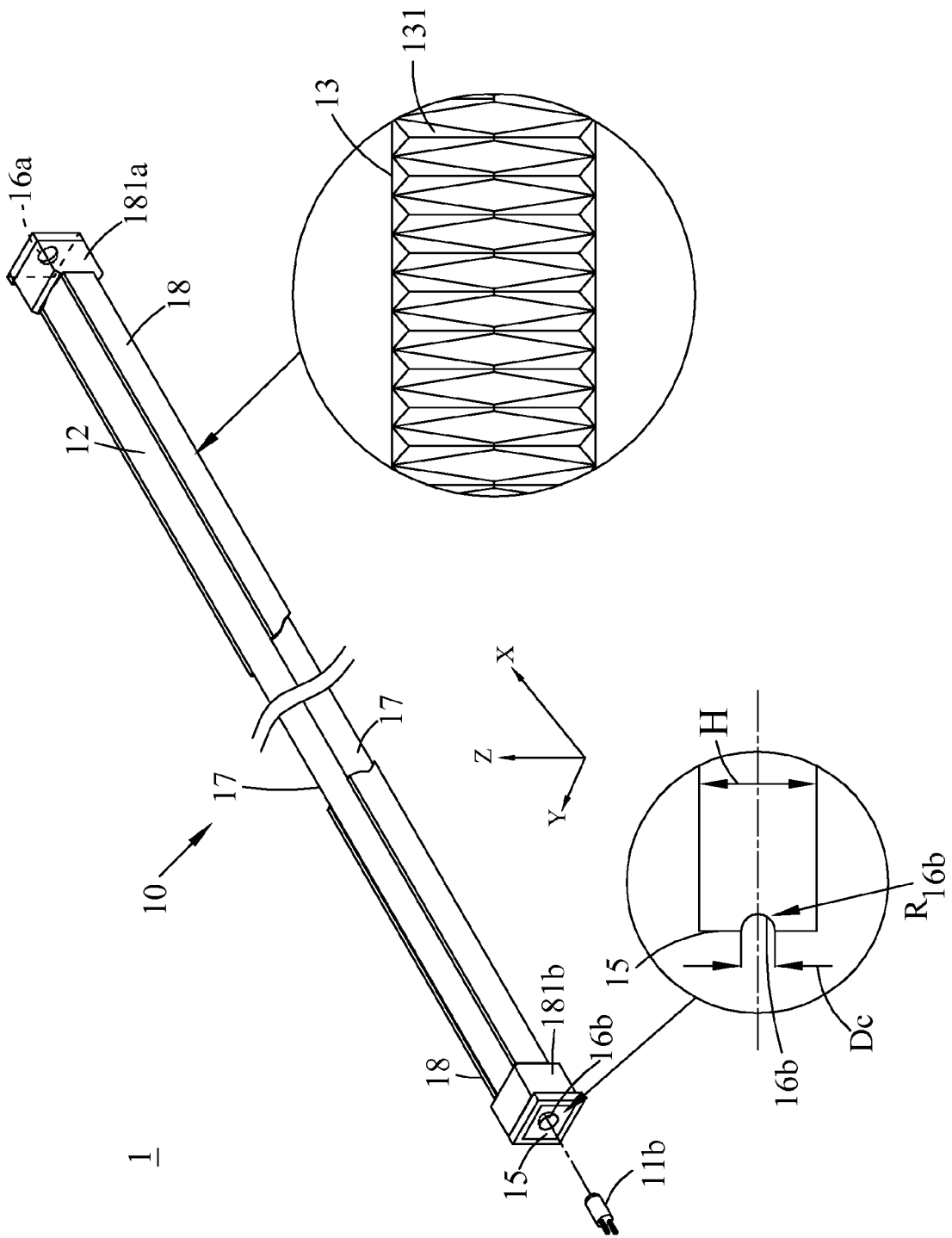
FIG. 13 shows a diagram of the linear light source having a light guide with the tapered saw tooth structures for a second embodiment according to the present invention.

Refer to FIG. 13, wherein a diagram of the linear light source having a light guide with the tapered saw tooth structures for the present embodiment is shown. In the present embodiment, the light guide 10 is made of an optical material, Polycarbonates (PC), refractive index $n_d$=1.58, and the incident surface 15 is a concave optical surface 16 and the ejective surface 12 is a plane in the sub scanning direction. Relevant parameters for such a light guide 10 are illustrated in the following Table 2.

TABLE 2

Relevant Parameters for Light Guide according to Second Embodiment

| | |
|---|---|
| Refractive Index $n_d$ | 1.58 |
| Curvature Radius of Ejective Surface in Main Scanning Direction $R_{12Y}$ (mm) | −10.13 |
| Curvature Radius of Ejective Surface in Sub scanning Direction $R_{12X}$ (mm) | ∞ |
| Chamfer Surface Angle $\theta_c$ (deg.) | 45 |
| Projection Length of Chamfer Surface in Main Scanning Direction c (mm) | 0.49 |
| Distance between Two Tapered Saw Teeth d (mm) | 0.5 |
| Length from Bottom of Tapered Saw Teeth to Apex of Ejective Surface Hz (mm) | 6.85 |
| Concave Curvature Radii $R_{16a}$ and $R_{16b}$ of Incident Surface (mm) | −1.2 |
| Concave Diameter of Incident Surface Dc (mm) | 3.0 |

Figure 15:
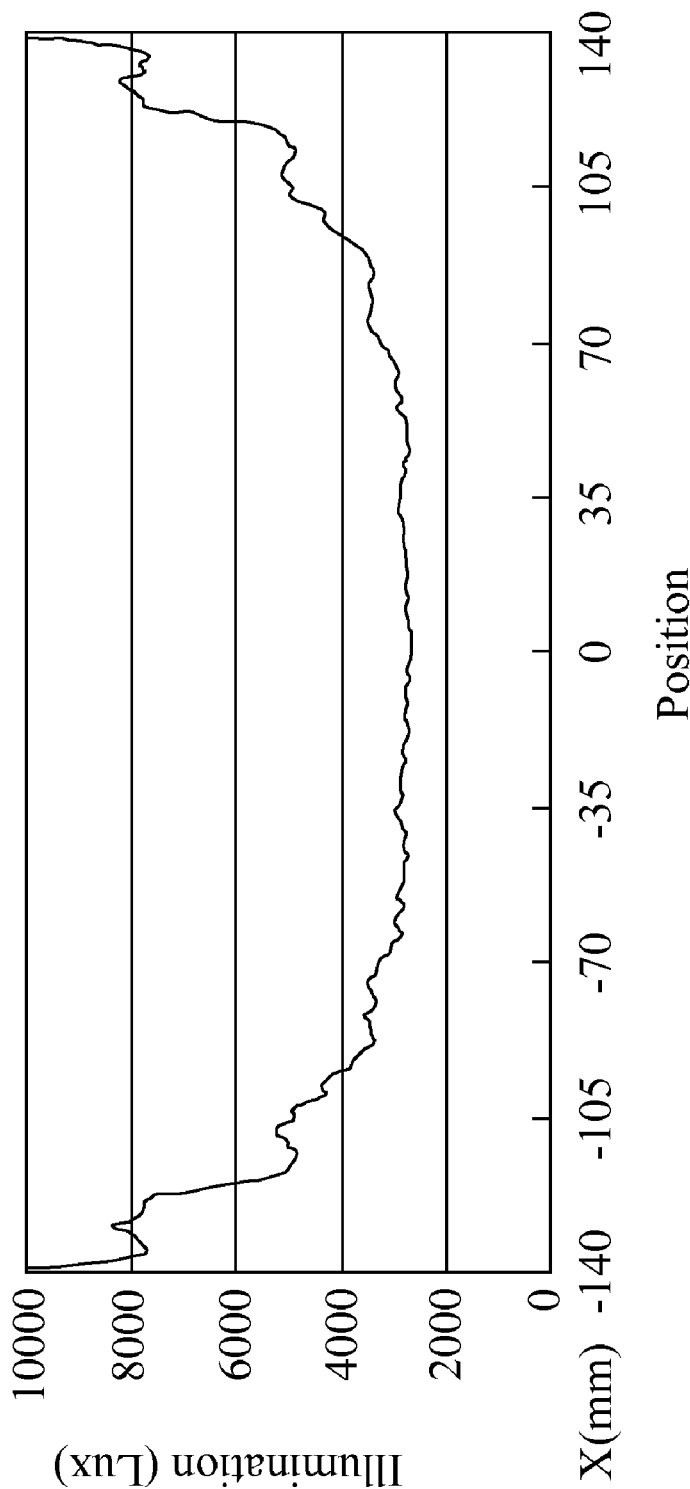
FIG. 15 shows a diagram of relationship between position and root mean square illumination in the sub scanning direction at 7 mm from the ejective surface in the light guide of the second embodiment.
Figure 16:
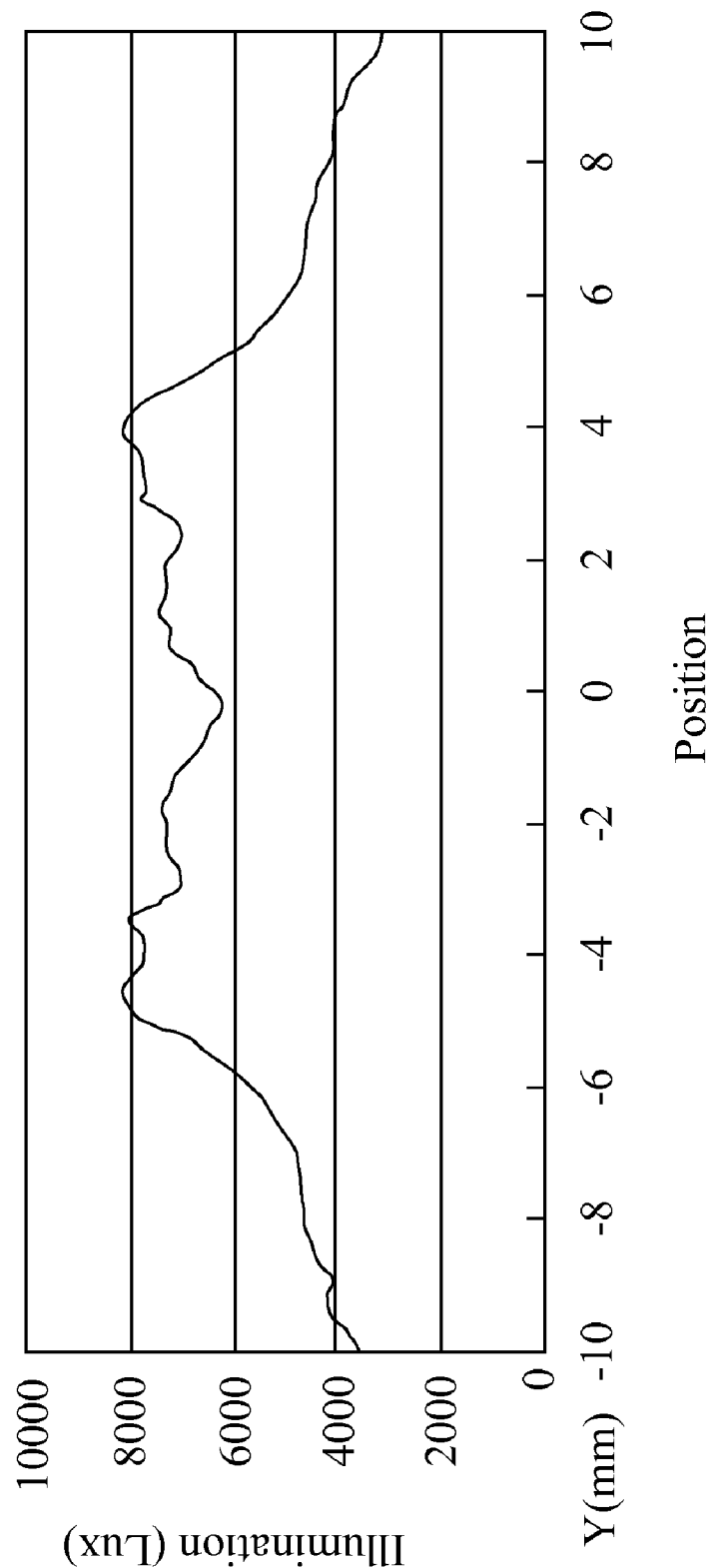
FIG. 16 shows a diagram of relationship between position and root mean square illumination in the main scanning direction at 7 mm from the ejective surface in the light guide of the second embodiment.

The document to be scanned is placed at 7 mm on the top of the two ends of the light guide 10. The illumination distribution of the light guide 10 on the document can be shown in FIGS. 15 and 16, in which a diagram of relationship between scanning position and root mean square illumination flux in the sub scanning direction and a diagram of root mean square illumination flux in the main scanning direction is respectively depicted. As shown in FIGS. 15 and 16, the linear light source 1 according to the present embodiment is able to provide an U-shape illumination distribution with complementary effect corresponding to the pickup lens and the CCD image sensor in the sub scanning direction as well as a linearly converged illumination distribution in the main scanning direction for the document to be scanned.

Third Embodiment

Refer to FIG. 13, wherein a diagram of the linear light source having a light guide with the tapered saw tooth structures for the present embodiment is shown. In the present embodiment, the light guide 10 is made of an optical material, Polymethyl Methacrylate (PMMA), refractive index $n_d$=1.49, and the incident surface 15 is a concave optical surface 16 and the ejective surface 12 is a plane in the sub scanning direction. Relevant parameters for such a light guide 10 are illustrated in the following Table 3.

TABLE 3

Relevant Parameters for Light Guide according to Third Embodiment

| | |
|---|---|
| Refractive Index $n_d$ | 1.49 |
| Curvature Radius of Ejective Surface in Main Scanning Direction $R_{12Y}$ (mm) | −12.01 |
| Curvature Radius of Ejective Surface in Sub scanning Direction $R_{12X}$ (mm) | 7175 |
| Chamfer Surface Angle $\theta_c$ (deg.) | 38.5 |
| Projection Length of Chamfer Surface in Main Scanning Direction c (mm) | 0.5 |
| Distance between Two Tapered Saw Teeth d (mm) | 0.51 |
| Length from Bottom of Tapered Saw Teeth to Apex of Ejective Surface Hz (mm) | 6.82 |
| Concave Curvature Radii $R_{16a}$ and $R_{16b}$ of Incident Surface (mm) | −1.2 |
| Concave Diameter of Incident Surface Dc (mm) | 3.0 |

Figure 14:
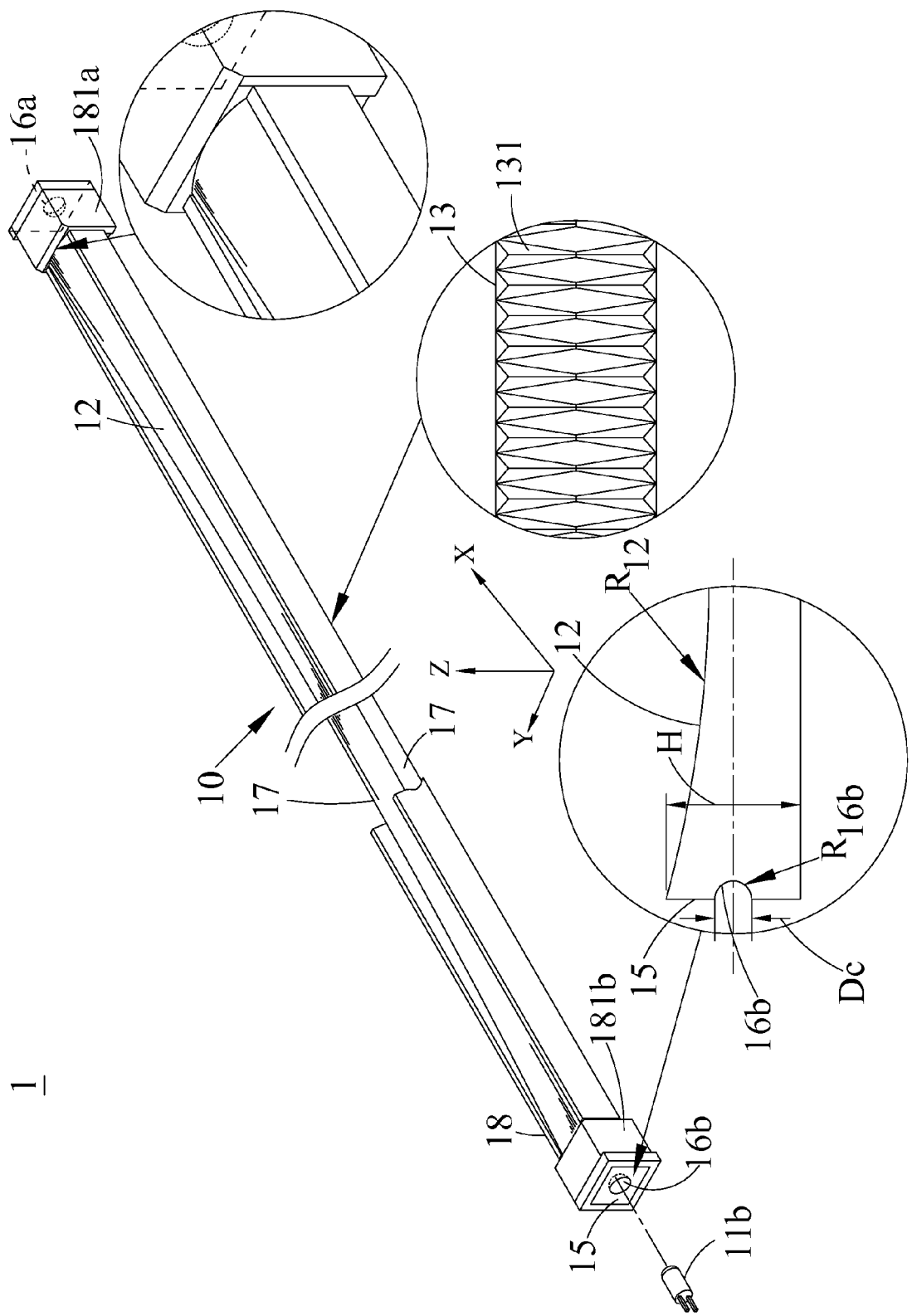
FIG. 14 shows a diagram of the linear light source having a light guide with the tapered saw tooth structures for a third embodiment according to the present invention.
Figure 17:
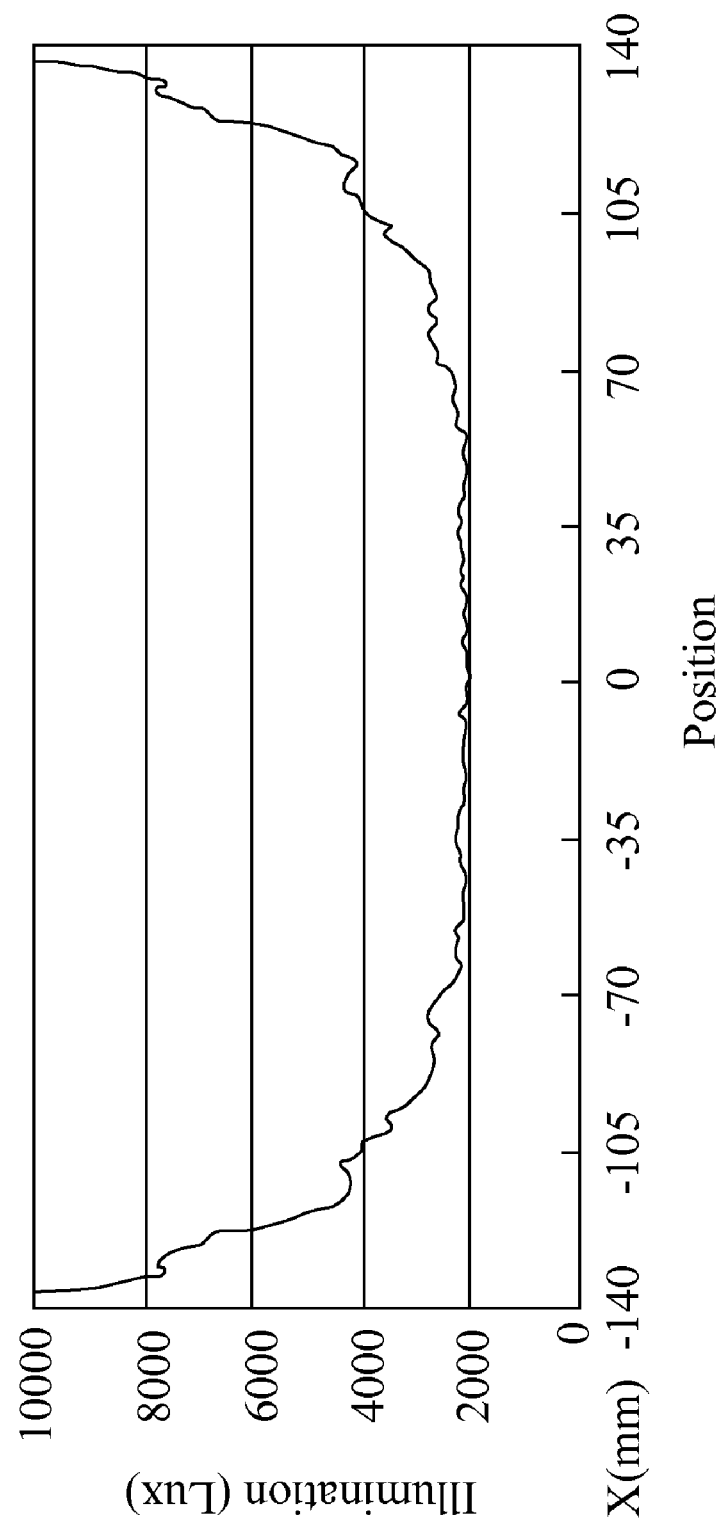
FIG. 17 shows a diagram of relationship between position and root mean square illumination in the sub scanning direction at 7 mm from the ejective surface in the light guide of the third embodiment.
Figure 18:
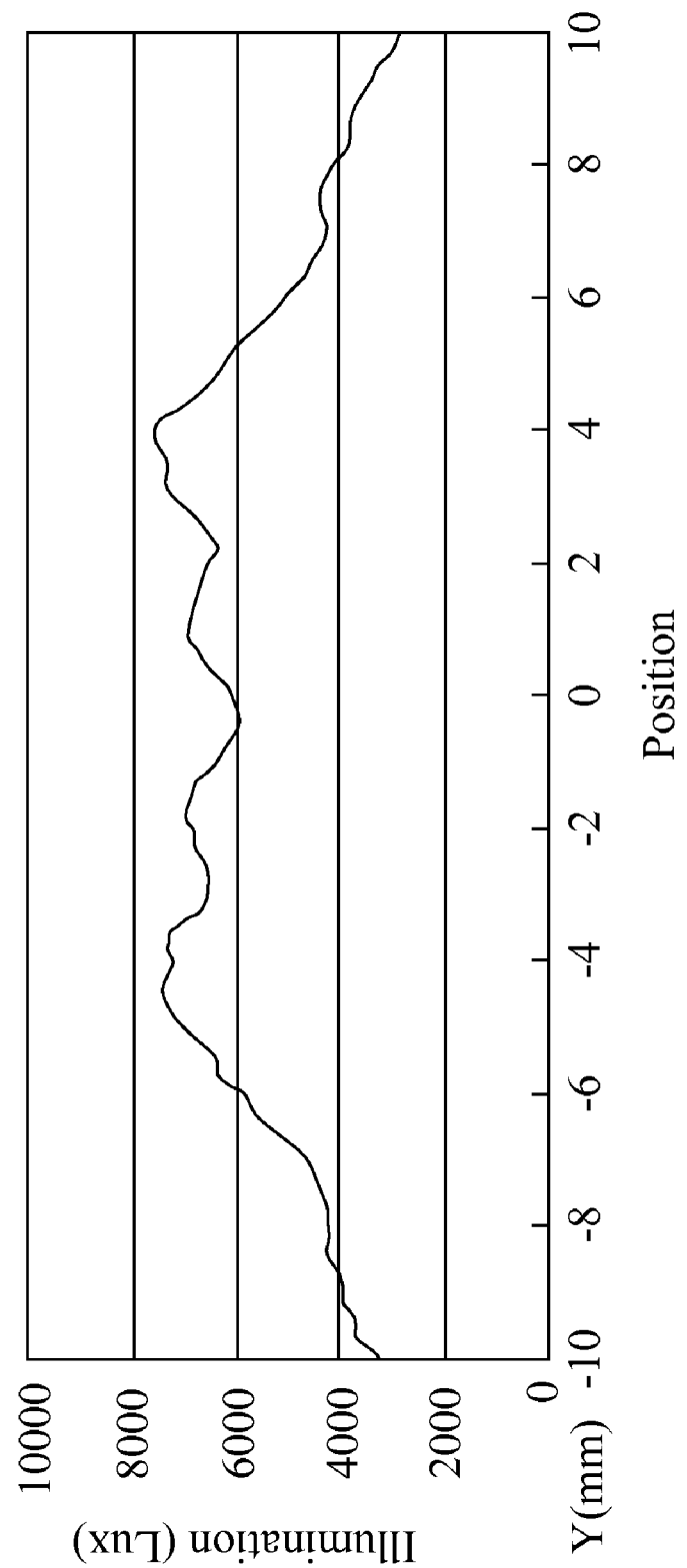
FIG. 18 shows a diagram of relationship between position and root mean square illumination in the main scanning direction at 7 mm from the ejective surface in the light guide of the third embodiment.

The illumination distribution of the linear light source 1 for the present embodiment on the document can be shown in FIGS. 17 and 18, in which a diagram of relationship between scanning position and root mean square illumination flux in the sub scanning direction and a diagram of root mean square illumination flux in the main scanning direction is respectively depicted. As shown in FIGS. 17 and 18, the linear light source 1 according to the present embodiment is able to provide an U-shape illumination distribution with complementary effect corresponding to the pickup lens and the CCD image sensor in the sub scanning direction as well as a linearly converged illumination distribution in the main scanning direction for the document to be scanned Fourth Embodiment Refer to FIG. 14, wherein a diagram of the linear light source having a light guide with the tapered saw tooth structures for the present embodiment is shown. In the present embodiment, the light guide 10 is made of an optical material, Polymethyl Methacrylate (PMMA), refractive index $n_d$=1.49, and the incident surface 15 is a concave optical surface 16 and the ejective surface 12 is a concave optical surface in the sub scanning direction. Relevant parameters for such a light guide 10 are illustrated in the following Table 4.

TABLE 4

Relevant Parameters for Light Guide according to Fourth Embodiment

| | |
|---|---|
| Refractive Index $n_d$ | 1.49 |
| Curvature Radius of Ejective Surface in Main Scanning Direction $R_{12Y}$ (mm) | −12.01 |
| Curvature Radius of Ejective Surface in Sub scanning Direction $R_{12X}$ (mm) | 7175 |
| Chamfer Surface Angle $\theta_c$ (deg.) | 37.5 |
| Projection Length of Chamfer Surface in Main Scanning Direction c (mm) | 0.8 |
| Distance between Two Tapered Saw Teeth d (mm) | 0.55 |
| Length from Bottom of Tapered Saw Teeth to Apex of Ejective Surface Hz (mm) | 7.0 |
| Concave Curvature Radii $R_{16a}$ and $R_{16b}$ of Incident Surface (mm) | −1.2 |
| Concave Diameter of Incident Surface Dc (mm) | 3.0 |

Figure 19:
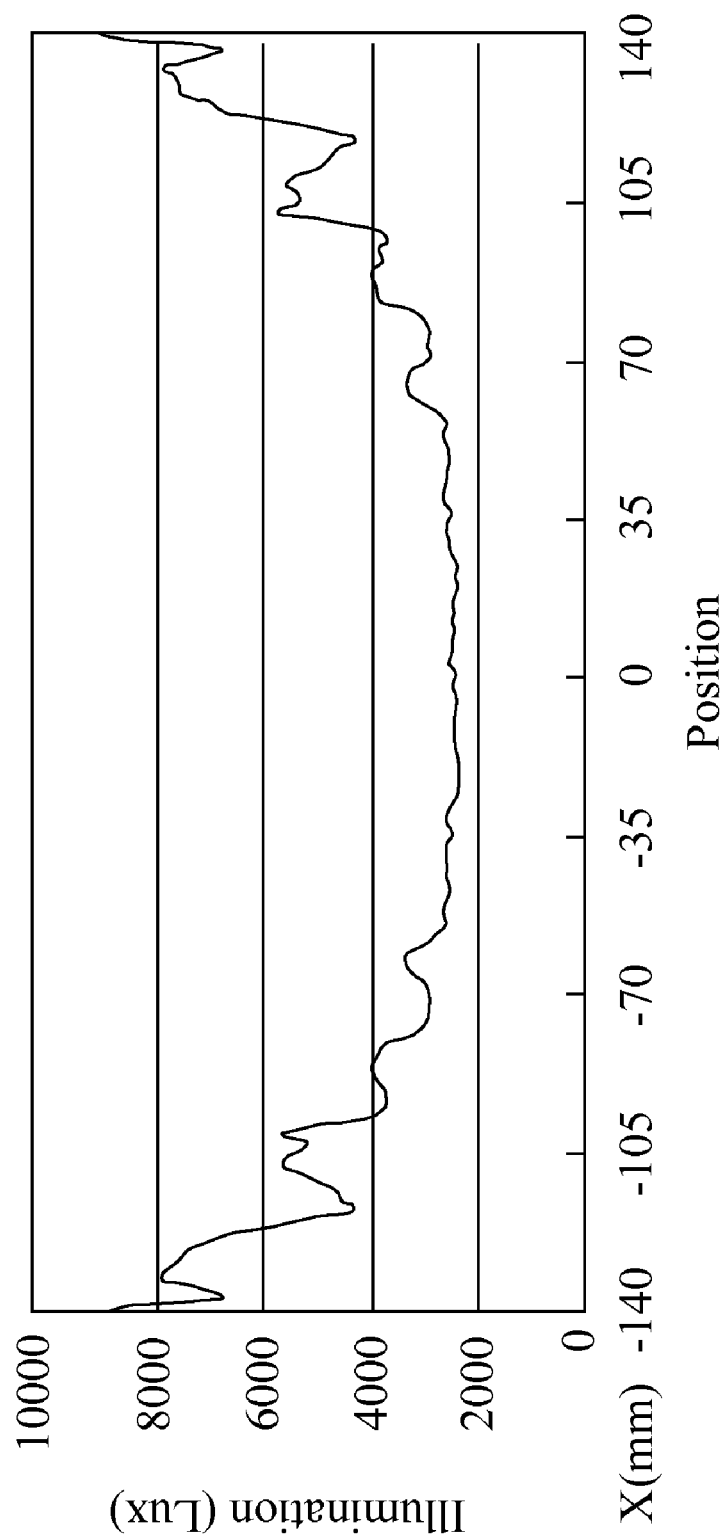
FIG. 19 shows a diagram of relationship between position and root mean square illumination in the sub scanning direction at 7 mm from the ejective surface in the light guide of the fourth embodiment.
Figure 20:
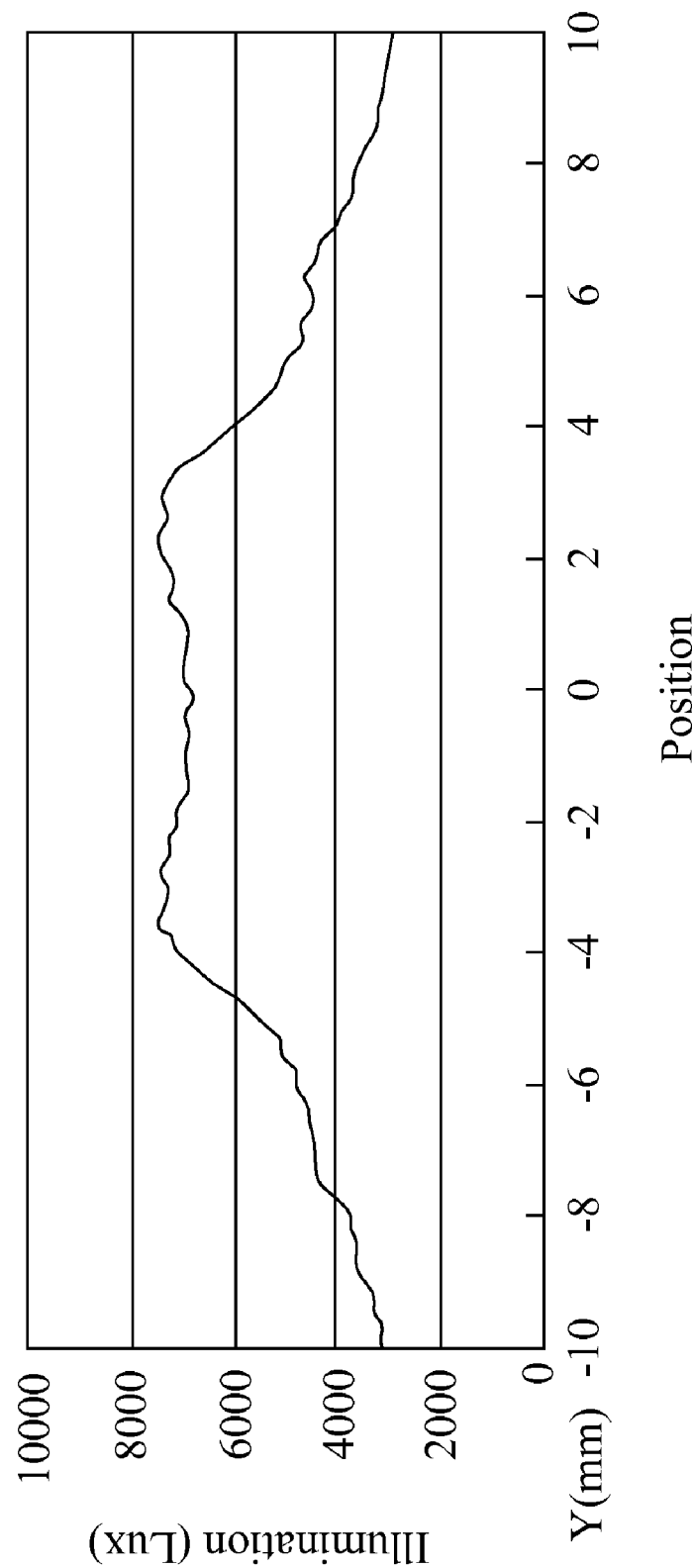
FIG. 20 shows a diagram of relationship between position and root mean square illumination in the main scanning direction at 7 mm from the ejective surface in the light guide of the fourth embodiment.

The illumination distribution of the linear light source 1 for the present embodiment on the document can be shown in FIGS. 19 and 20, in which a diagram of relationship between scanning position and root mean square illumination flux in the sub scanning direction and a diagram of root mean square illumination flux in the main scanning direction is respectively depicted. As shown in FIGS. 19 and 20, the linear light source 1 according to the present embodiment is able to provide an U-shape illumination distribution with complementary effect corresponding to the pickup lens and the CCD image sensor in the sub scanning direction as well as a linearly converged illumination distribution in the main scanning direction for the document to be scanned Fifth Embodiment Refer to FIG. 14, wherein a diagram of the linear light source having a light guide with the tapered saw tooth structures for the present embodiment is shown. In the present embodiment, the light guide 10 is made of an optical material, Polycarbonates (PC), refractive index $n_d$=1.58, and the incident surface 15 is a concave optical surface 16 and the ejective surface 12 is a concave optical surface in the sub scanning direction. Relevant parameters for such a light guide 10 are illustrated in the following Table 5.

TABLE 5

Relevant Parameters for Light Guide according to Fifth Embodiment

| | |
|---|---|
| Refractive Index $n_d$ | 1.58 |
| Curvature Radius of Ejective Surface in Main Scanning Direction $R_{12Y}$ (mm) | −10.13 |
| Curvature Radius of Ejective Surface in Sub scanning Direction $R_{12X}$ (mm) | 8512 |
| Chamfer Surface Angle $\theta_c$ (deg.) | 45.0 |
| Projection Length of Chamfer Surface in Main Scanning Direction c (mm) | 0.5 |
| Distance between Two Tapered Saw Teeth d (mm) | 0.5 |
| Length from Bottom of Tapered Saw Teeth to Apex of Ejective Surface Hz (mm) | 6.85 |
| Concave Curvature Radii $R_{16a}$ and $R_{16b}$ of Incident Surface (mm) | −2.5 |
| Concave Diameter of Incident Surface Dc (mm) | 3.0 |

Figure 21:
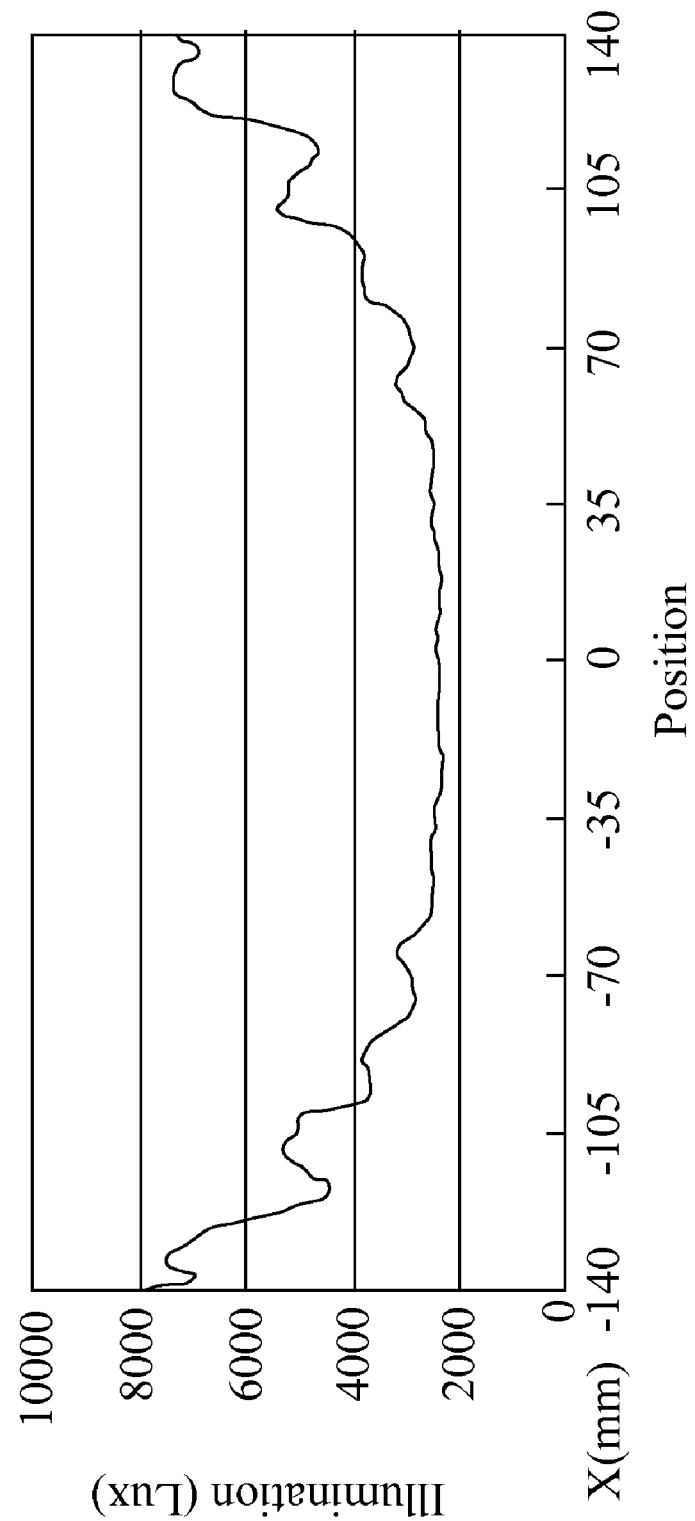
FIG. 21 shows a diagram of relationship between position and root mean square illumination in the sub scanning direction at 7 mm from the ejective surface in the light guide of the fifth embodiment.
Figure 22:
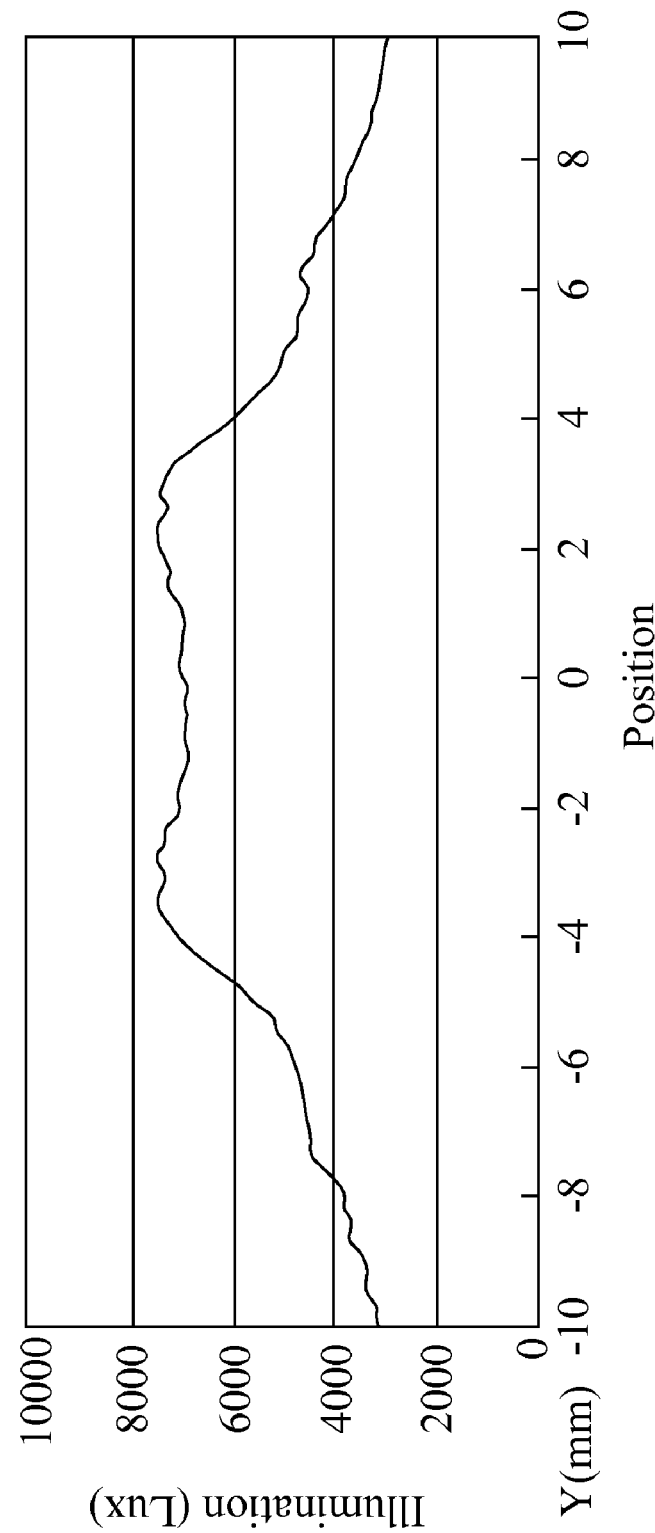
FIG. 22 shows a diagram of relationship between position and root mean square illumination in the main scanning direction at 7 mm from the ejective surface in the light guide of the fifth embodiment.

The illumination distribution of the linear light source 1 for the present embodiment on the document can be shown in FIGS. 21 and 22, in which a diagram of relationship between scanning position and root mean square illumination flux in the sub scanning direction and a diagram of root mean square illumination flux in the main scanning direction is respectively depicted. As shown in FIGS. 21 and 22, the linear light source 1 according to the present embodiment is able to provide an U-shape illumination distribution with complementary effect corresponding to the pickup lens and the CCD image sensor in the sub scanning direction as well as a linearly converged illumination distribution in the main scanning direction for the document to be scanned In summary of the aforementioned descriptions, the linear light source having a light guide with the tapered saw tooth structures according to the present invention provides beneficial effects in that it is possible to, by means of the light guide comprises the tapered saw tooth structures and the installation of LED light sources at the incident surfaces on two sides, form an appropriate illumination distribution, thereby facilitating applications in high-resolution and high-speed scanners.

The illustrations described as above are simply exemplary, rather than being restrictive. All effectively equivalent changes, modifications or substitutions imposed thereon without departing from the spirit and scope of the present invention are deemed to be encompassed by the claims set forth hereunder.

What is claimed is:

1. A linear light source having a light guide with tapered saw tooth structures, applied to a Charge Coupling Device Module (CCDM), the CCDM including a CCD image sensor and a pickup lens, said linear light source comprising a light guide, a reflective cartridge and two Light Emitting Diodes (LEDs) for emitting a light onto a object; wherein said light guide is made of optical material including two incident surfaces, a reflective surface, two refractive surfaces and an ejective surface; said ejective surface is facing toward the object side, said reflective surface is disposed correspondingly to said ejective surface; said two refractive surfaces are disposed on two sides of the reflective surface; said two refractive surfaces and said reflective surface are covered by said reflective cartridge; wherein, the reflective surface of the light guide has the tapered saw tooth structures protruding therefrom, wherein every two of the tapered saw tooth structures are disposed and connected at a concave apex along the main scanning direction, each of the tapered saw tooth structures including a chamfer surface on each side along the main scanning direction with a triangle cross-section shape in the sub-scanning direction that is disposed near the refractive surfaces and has an acute angle with the reflective surface projected on the main scanning direction; the ejective surface has a convex optical surface in the main scanning direction facing toward the object side; wherein, the two LEDs are disposed on said two incident surfaces at two ends of the light guide individually; thus, the light emitted from the LED entering into the light guide from said incident surfaces, reflecting by the reflective surface, refracting by the refractive surface and ejecting from the ejective surface is projected onto the object; such that the ejecting light from the ejective surface forms a linearly converged illumination distribution in the main scanning direction and a U-shaped illumination distribution in the sub scanning direction.

2. The linear light source as set forth in claim 1, the said incident surface of the light guide comprises a concave optical surface faced toward the LED;
where the center of the concave optical surface is located on the light incidence axis which is connected by the central of two LEDs.

3. The linear light source as set forth in claim 1, the said ejective surface of the light guide comprises a concave optical surface along the sub scanning direction;
wherein said concave optical surface is facing toward the object side.

* * * * *